US008509044B2

(12) United States Patent
Hino et al.

(10) Patent No.: US 8,509,044 B2
(45) Date of Patent: Aug. 13, 2013

(54) RECORDING MEDIUM AND RECORDING OR REPRODUCING APPARATUS THEREFOR FOR RECORDING OR REPRODUCING CONTROL INFORMATION

(75) Inventors: Yasumori Hino, Nara (JP); Junya Shiraishi, Nagano (JP); Hiroyasu Inoue, Nagano (JP); Koichi Watanabe, Tokyo (JP)

(73) Assignees: Panasonic Corporation, Osaka (JP); Sony Corporation, Tokyo (JP); TDK Corporation, Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/391,906

(22) PCT Filed: Sep. 16, 2010

(86) PCT No.: PCT/JP2010/005654
§ 371 (c)(1),
(2), (4) Date: Mar. 23, 2012

(87) PCT Pub. No.: WO2011/036858
PCT Pub. Date: Mar. 31, 2011

(65) Prior Publication Data
US 2012/0170433 A1 Jul. 5, 2012

(30) Foreign Application Priority Data
Sep. 25, 2009 (JP) ................. 2009-221652

(51) Int. Cl.
*G11B 20/10* (2006.01)
(52) U.S. Cl.
USPC .................... 369/59.11; 369/275.3

(58) Field of Classification Search
None
See application file for complete search history.

(56) References Cited

U.S. PATENT DOCUMENTS 7,471,605 B2   12/2008   Fujita et al.
7,486,603 B2   2/2009    Fujita et al.

(Continued)

FOREIGN PATENT DOCUMENTS

| JP | 2005-92942  | 4/2005  |
| JP | 2006-313621 | 11/2006 |
| JP | 2007-305234 | 11/2007 |
| WO | 2006/028114 | 3/2006  |

OTHER PUBLICATIONS

International Search Report issued Nov. 22, 2010 in International (PCT) Application No. PCT/JP2010/005654.

(Continued)

*Primary Examiner* — Paul Huber
(74) *Attorney, Agent, or Firm* — Wenderoth, Lind & Ponack, L.L.P.

(57) ABSTRACT

A recording medium and apparatus enable the number of data units of recording pulse information to be reduced. The recording medium includes an information area for recording set values of a recording pulse for forming recording marks. The set values include preceding space-based set values having a first reference value as a set value of a recording pulse corresponding to a predetermined preceding space and a first difference set value of a recording pulse corresponding to a space other than the predetermined preceding space; and trailing space-based set values having a second reference value as a set value of a recording pulse corresponding to a predetermined trailing space and a second difference set value of a recording pulse corresponding to a space other than the predetermined trailing space and which is expressed as a difference from the second reference value.

7 Claims, 23 Drawing Sheets

(56) References Cited

U.S. PATENT DOCUMENTS

| | | |
|---|---|---|
| 7,489,610 B2 | 2/2009 | Fujita et al. |
| 7,492,688 B2 | 2/2009 | Fujita et al. |
| 7,961,580 B2 | 6/2011 | Fujita et al. |
| 2005/0058047 A1 | 3/2005 | Fujita et al. |
| 2007/0263513 A1 | 11/2007 | Tsukuda et al. |
| 2008/0074972 A1 | 3/2008 | Horikawa et al. |
| 2008/0291795 A1 | 11/2008 | Fujita et al. |
| 2008/0291796 A1 | 11/2008 | Fujita et al. |
| 2009/0010132 A1 | 1/2009 | Fujita et al. |
| 2009/0109814 A1 | 4/2009 | Fujita et al. |
| 2011/0209166 A1 | 8/2011 | Fujita et al. |

OTHER PUBLICATIONS

Illustrated Guide to Blu-ray Disc (p. 28), published by Ohmsha, Ltd., Dec. 10, 2006 (along with partial translation).
Optical Disc Technology by Radio Gijutsu Sha (grounds for setting beam size to 390 nm), pp. 27-28, published by Radio Gijutsu Sha, Feb. 10, 1998 (along with partial translation).

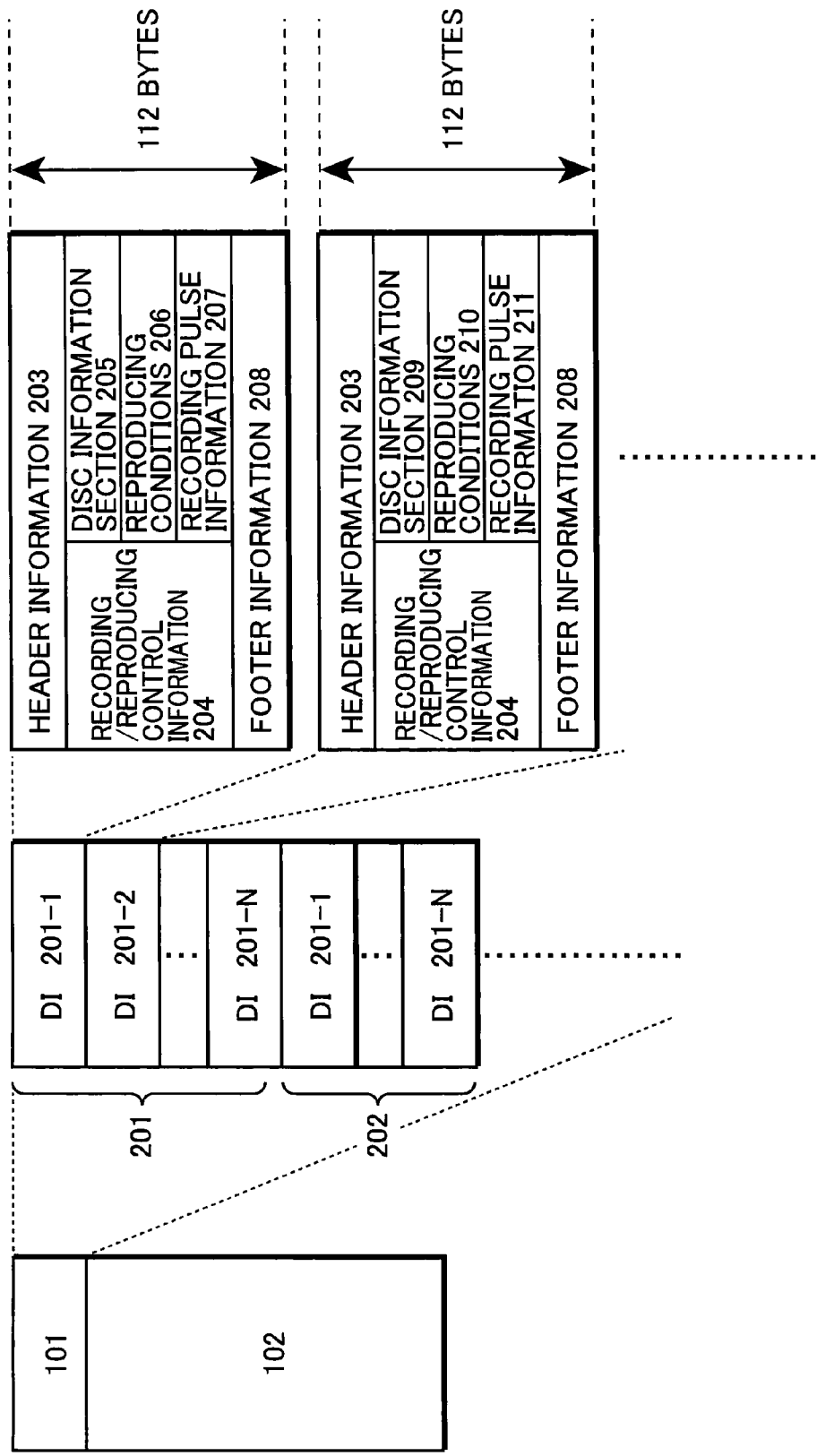

FIG.3

| CONTENTS | | | NUMBER OF BYTES | |
|---|---|---|---|---|
| HEADER INFORMATION 203 | | | | 7Bytes |
| RECORDING /REPRODUCING CONTROL INFORMATION 204 | DISC INFORMATION SECTION 205 | MEDIA TYPE OF LAYER 301 | 3Bytes | 18Bytes |
| | | DISC SIZE/VERSION INFORMATION 302 | 1Byte | |
| | | DISC STRUCTURE INFORMATION 303 | 1Byte | |
| | | HYBRID DISC STRUCTURE INFORMATION/CHANNEL BIT LENGTH 304 | 1Byte | |
| | | POLARITY OF TRACKING SIGNAL OF EACH LAYER 305 | 1Byte | |
| | | POLARITY OF RECORDING MARK OF EACH LAYER 306 | 1Byte | |
| | | BCA (BURST CUTTING AREA) PRESENCE/ABSENCE FLAG 307 | 1Byte | |
| | | DATA AREA MANAGEMENT INFORMATION 308 | 8Bytes | |
| | | RESERVED 309 | 1Byte | |
| | | RECORDING/REPRODUCING SPEED 310 | 2Bytes | |
| | REPRODUCING CONDITIONS 206 | MAXIMUM REPRODUCING POWER WITHOUT HIGH FREQUENCY SUPERPOSITION 311 | 1Byte | 5Bytes |
| | | MAXIMUM REPRODUCING POWER DURING HIGH FREQUENCY SUPERPOSITION 312 | 1Byte | |
| | | RESERVED 313 | 1Byte | |
| | RECORDING PULSE CONDITIONS 211 | RECORDING POWER INFORMATION 314 | 9Bytes | 69Bytes |
| | | RECORDING PULSE INFORMATION 315 | 60Bytes | |
| FOOTER INFORMATION | | | | 12Bytes |

FIG.4

(a) dTtop/Top TABLE

| MARK \ TRAILING SPACE / PRECEDING SPACE | 2S | 2M | | ≥3S | 3M | 4M | ≥5M |
|---|---|---|---|---|---|---|---|
| 2S | 0.5 | 0.5 | | 0.5 | 0.5 | 0.5 | 0.5 |
| 3S | 0.5 | 0.5 | | 0.5 | 0.5 | 0.5 | 0.5 |
| 4S | 0.5 | 0.5 | | 0.5 | 0.5 | 0.5 | 0.5 |
| ≥5S | 1 | 1 | | 1 | 1 | 1 | 1 |

(b) dTs TABLE

| MARK \ PRECEDING SPACE / TRAILING SPACE | 2S | 2M | >-3S | 3M | 4M | ≥5M |
|---|---|---|---|---|---|---|
| 2S | 0.5 | 0.5 | 0.5 | 0.5 | 0.5 | 0.5 |
| 3S | 0.5 | 0.5 | 0.5 | 0.5 | 0.5 | 0.5 |
| 4S | 0.5 | 0.5 | 0.5 | 0.5 | 0.5 | 0.5 |
| ≥5S | 1 | 1 | 1 | 1 | 1 | 1 |

(c) dTc TABLE

| MARK \ TRAILING SPACE | 3M | 4M | ≥5M |
|---|---|---|---|
| 2S | 0.5 | 0.5 | 0.5 |
| 3S | 0.5 | 0.5 | 0.5 |
| 4S | 0.5 | 0.5 | 0.5 |
| ≥5S | 1 | 1 | 1 |

(d) Tlp TABLE

| MARK \ TRAILING SPACE | 4M | ≥5M |
|---|---|---|
| 2S | 0.5 | 0.5 |
| 3S | 0.5 | 0.5 |
| 4S | 0.5 | 0.5 |
| ≥5S | 1 | 1 |

☐ OFFSET PULSE SET VALUE
▨ REFERENCE PULSE SET VALUE

FIG.5

(a) dTtop/Top TABLE

| MARK<br>PRECEDING SPACE / TRAILING SPACE | 2M | | 3M | 4M | ≧5M |
|---|---|---|---|---|---|
| | 2S | ≧3S | | | |
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≧5S | 1 | 1 | 1 | 1 | 1 |

(b) dTs TABLE

| MARK<br>PRECEDING SPACE / TRAILING SPACE | 2M | | 3M | 4M | ≧5M |
|---|---|---|---|---|---|
| | 2S | ≧3S | | | |
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≧5S | 1 | 1 | 1 | 1 | 1 |

(c) dTlp/Tlp TABLE

| MARK / TRAILING SPACE | 3M | 4M | ≧5M |
|---|---|---|---|
| 2S | 0.5 | 0.5 | 0.5 |
| 3S | 0.5 | 0.5 | 0.5 |
| 4S | 0.5 | 0.5 | 0.5 |
| ≧5S | 1 | 1 | 1 |

(d) Tmp TABLE

| Tmp |
|---|
| 1 |

☐ REFERENCE PULSE SET VALUE      ☐ OFFSET PULSE SET VALUE

FIG.6

(a) dTtop/Top TABLE

| MARK<br>TRAILING SPACE / PRECEDING SPACE | 2M 2S | 2M ≥=3S | 3M | 4,6,8M | 5,7,9M |
|---|---|---|---|---|---|
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≥=5S | 1 | 1 | 1 | 1 | 1 |

(b) dTs TABLE

| MARK<br>PRECEDING SPACE / TRAILING SPACE | 2M 2S | 2M ≥=3S | 3M | 4,6,8M | 5,7,9M |
|---|---|---|---|---|---|
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≥=5S | 1 | 1 | 1 | 1 | 1 |

(c) dTlp/Tlp TABLE

| MARK<br>TRAILING SPACE | 4,6,8M | 5,7,9M |
|---|---|---|
| 2S | 0.5 | 0.5 |
| 3S | 0.5 | 0.5 |
| 4S | 0.5 | 0.5 |
| ≥=5S | 1 | 1 |

(d) Tmp TABLE

| Tmp |
|---|
| 1 |

REFERENCE PULSE SET VALUE    OFFSET PULSE SET VALUE

FIG.7

| CONTENTS | | N-1 RECORDING PULSE TYPE | | CA RECORDING PULSE TYPE | | N/2 RECORDING PULSE TYPE | |
|---|---|---|---|---|---|---|---|
| | | PARAMETER | NUMBER OF BYTES | PARAMETER | NUMBER OF BYTES | PARAMETER | NUMBER OF BYTES |
| RECORDING PULSE INFORMATION 315 | TABLE OF 5T-SPACE OR MORE 701 | dTtop-5S | 5 | dTtop-5S | 5 | dTtop-5S | 5 |
| | | Ttop-5S | 5 | Ttop-5S | 5 | Ttop-5S | 5 |
| | | dTlp-5S | 3 | dTc-5S | 3 | dTlp-5S | 2 |
| | | Tlp-5S | 3 | Tlp-5S | 2 | Tlp-5S | 2 |
| | | dTs-5S | 5 | dTs-5S | 5 | dTs-5S | 5 |
| | | Tmp | 1 | | | Tmp | 1 |
| | TABLE OF OTHER THAN 5T-SPACE OR MORE 702 | ΔdTtop | 7.5 | ΔdTtop | 7.5 | ΔdTtop | 7.5 |
| | | ΔTtop | 7.5 | ΔTtop | 7.5 | ΔTtop | 7.5 |
| | | ΔdTlp | 4.5 | ΔdTc | 4.5 | ΔdTlp | 3 |
| | | ΔTlp | 4.5 | ΔTlp | 3 | ΔTlp | 3 |
| | | ΔdTs | 7.5 | ΔdTs | 7.5 | ΔdTs | 7.5 |
| TOTAL NUMBER OF BYTES | | | 53.5 | | 50 | | 48.5 |

FIG.9

(a) dTtop TABLE

| MARK<br>TRAILING SPACE \ PRECEDING SPACE | 2M | | 3M | 4M | ≥5M |
|---|---|---|---|---|---|
| | 2S | ≥3S | | | |
| 2S | 1 | | 0.5 | 0.5 | 0.5 |
| 3S | 0.5 | 1 | 0.5 | 0.5 | 0.5 |
| 4S | 0.5 | 0.5 | 0.5 | 0.5 | 0.5 |
| ≥5S | 1 | 1 | 1 | 1 | 1 |

(b) Ttop TABLE

| MARK<br>TRAILING SPACE \ PRECEDING SPACE | 2M | | 3M | 4M | ≥5M |
|---|---|---|---|---|---|
| | 2S | ≥3S | | | |
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≥5S | 1 | 1 | 1 | 1 | 1 |

(c) dTs TABLE

| MARK<br>PRECEDING SPACE \ TRAILING SPACE | 2M | | 3M | 4M | ≥5M |
|---|---|---|---|---|---|
| | 2S | ≥3S | | | |
| 2S | 1 | | 0.5 | 0.5 | 0.5 |
| 3S | 0.5 | 1 | 0.5 | 0.5 | 0.5 |
| 4S | 0.5 | 0.5 | 0.5 | 0.5 | 0.5 |
| ≥5S | 1 | 1 | 1 | 1 | 1 |

(d) dTc TABLE

| MARK<br>TRAILING SPACE | 2S | 3M | 4M | ≥5M |
|---|---|---|---|---|
| 2S | 0.5 | 0.5 | 0.5 | 0.5 |
| 3S | 0.5 | 0.5 | 0.5 | 0.5 |
| 4S | 0.5 | 0.5 | 0.5 | 0.5 |
| ≥5S | 1 | 1 | 1 | 1 |

(e) Tlp TABLE

| MARK<br>TRAILING SPACE | 4M | ≥5M |
|---|---|---|
| 2S | 0.5 | 0.5 |
| 3S | 0.5 | 0.5 |
| 4S | 0.5 | 0.5 |
| ≥5S | 1 | 1 |

Legend:
- ▓ REFERENCE PULSE SET VALUE
- ☐ OFFSET PULSE SET VALUE

FIG.10

(a) dTtop TABLE

| MARK / PRECEDING SPACE \ TRAILING SPACE | 2M | | 3M | 4M | ≧5M |
|---|---|---|---|---|---|
| | 2S | ≧3S | | | |
| 2S | 1 | 1 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≧5S | 1 | 1 | 1 | 1 | 1 |

(b) Ttop TABLE

| MARK / TRAILING SPACE \ PRECEDING SPACE | 2M | | 3M | 4M | ≧5M |
|---|---|---|---|---|---|
| | 2S | ≧3S | | | |
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≧5S | 1 | 1 | 1 | 1 | 1 |

(c) dTs TABLE

| MARK / PRECEDING SPACE \ TRAILING SPACE | 2M | | 3M | 4M | ≧5M |
|---|---|---|---|---|---|
| | 2S | ≧3S | | | |
| 2S | 1 | 1 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≧5S | 1 | 1 | 1 | 1 | 1 |

(d) dTlp/Tlp TABLE

| MARK \ TRAILING SPACE | 3M | 4M | ≧5M |
|---|---|---|---|
| 2S | 0.5 | 0.5 | 0.5 |
| 3S | 0.5 | 0.5 | 0.5 |
| 4S | 0.5 | 0.5 | 0.5 |
| ≧5S | 1 | 1 | 1 |

(e) Tmp TABLE

| Tmp | 1 |
|---|---|

REFERENCE PULSE SET VALUE / OFFSET PULSE SET VALUE

FIG.11

(a) dTtop TABLE

| MARK<br>PRECEDING SPACE \ TRAILING SPACE | 2M 2S | 2M ≥3S | 3M | 4,6,8M | 5,7,9M |
|---|---|---|---|---|---|
| 2S | 1 | 1 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≥5S | 1 | 1 | 1 | 1 | 1 |

(b) Ttop TABLE

| MARK<br>PRECEDING SPACE \ TRAILING SPACE | 2M 2S | 2M ≥3S | 3M | 4,6,8M | 5,7,9M |
|---|---|---|---|---|---|
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≥5S | 1 | 1 | 1 | 1 | 1 |

(c) dTs TABLE

| MARK<br>PRECEDING SPACE \ TRAILING SPACE | 2M 2S | 2M ≥3S | 3M | 4,6,8M | 5,7,9M |
|---|---|---|---|---|---|
| 2S | 1 | 1 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| ≥5S | 1 | 1 | 1 | 1 | 1 |

(d) dTlp/Tlp TABLE

| MARK \ TRAILING SPACE | 4,6,8M | 5,7,9M |
|---|---|---|
| 2S | 0.5 | 0.5 |
| 3S | 0.5 | 0.5 |
| 4S | 0.5 | 0.5 |
| ≥5S | 1 | 1 |

(e) Tmp TABLE

| Tmp | 1 |
|---|---|

□ OFFSET PULSE SET VALUE
□ REFERENCE PULSE SET VALUE

FIG.12

| CONTENTS | | | N-1 RECORDING PULSE TYPE | | CA RECORDING PULSE TYPE | | N/2 RECORDING PULSE TYPE | |
|---|---|---|---|---|---|---|---|---|
| | | | PARAMETER | NUMBER OF BYTES | PARAMETER | NUMBER OF BYTES | PARAMETER | NUMBER OF BYTES |
| RECORDING PULSE INFORMATION 315 | TABLE OF 5T-SPACE OR MORE 701 | | dTtop-5S | 5 | dTtop-5S | 5 | dTtop-5S | 5 |
| | | | Ttop-5S | 5 | Ttop-5S | 5 | Ttop-5S | 5 |
| | | | dTlp-5S | 3 | dTc-5S | 3 | dTlp-5S | 2 |
| | | | Tlp-5S | 3 | Tlp-5S | 2 | Tlp-5S | 2 |
| | | | dTs-5S | 5 | dTs-5S | 5 | dTs-5S | 5 |
| | | | Tmp | 1 | | | Tmp | 1 |
| | TABLE OF OTHER THAN 5T-SPACE OR MORE 702 | | ΔdTtop | 8.5 | ΔdTtop | 8.5 | ΔdTtop | 8.5 |
| | | | ΔTtop | 7.5 | ΔTtop | 7.5 | ΔTtop | 7.5 |
| | | | ΔdTlp | 4.5 | ΔdTc | 4.5 | ΔdTlp | 3 |
| | | | ΔTlp | 4.5 | ΔTlp | 3 | ΔTlp | 3 |
| | | | ΔdTs | 8.5 | ΔdTs | 8.5 | ΔdTs | 8.5 |
| TOTAL NUMBER OF BYTES | | | | 55.5 | | 52 | | 50.5 |

FIG.14

(a) dTtop/Top TABLE

| MARK \ TRAILING SPACE \ PRECEDING SPACE | 2M | | 3M | 4M | ≥5M |
|---|---|---|---|---|---|
| | 2S | ≥=3S | | | |
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| >=5S | 0.5 | 0.5 | 0.5 | 0.5 | 0.5 |
| PREDETERMINED VALUE | 1 | 1 | 1 | 1 | 1 |

(b) dTs TABLE

| MARK \ PRECEDING SPACE \ TRAILING SPACE | 2M | | 3M | 4M | ≥5M |
|---|---|---|---|---|---|
| | 2S | >=3S | | | |
| 2S | 0.5 | 0.5 | 0.5 | 0.5 | 0.5 |
| 3S | 0.5 | 0.5 | 0.5 | 0.5 | 0.5 |
| 4S | 0.5 | 0.5 | 0.5 | 0.5 | 0.5 |
| >=5S | 0.5 | 0.5 | 0.5 | 0.5 | 0.5 |
| PREDETERMINED VALUE | 1 | 1 | 1 | 1 | 1 |

(c) dTc TABLE

| MARK \ TRAILING SPACE | 3M | 4M | ≥5M |
|---|---|---|---|
| 2S | 0.5 | 0.5 | 0.5 |
| 3S | 0.5 | 0.5 | 0.5 |
| 4S | 0.5 | 0.5 | 0.5 |
| >=5S | 0.5 | 0.5 | 0.5 |
| PREDETERMINED VALUE | 1 | 1 | 1 |

(d) Tlp TABLE

| MARK \ TRAILING SPACE | 4M | ≥5M |
|---|---|---|
| 2S | 0.5 | 0.5 |
| 3S | 0.5 | 0.5 |
| 4S | 0.5 | 0.5 |
| >=5S | 0.5 | 0.5 |
| PREDETERMINED VALUE | 1 | 1 |

☐ OFFSET PULSE SET VALUE
▨ REFERENCE PULSE SET VALUE

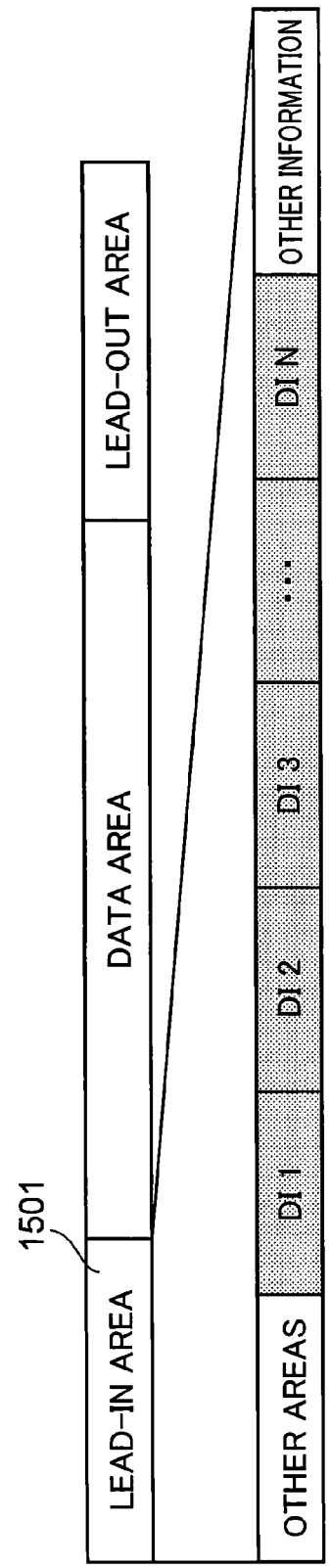

FIG.18

| CONTENTS | | | |
|---|---|---|---|
| HEADER INFORMATION | | | |
| RECORDING /REPRODUCING CONTROL INFORMATION | RECORDING PULSE TYPE | | |
| | REPRODUCING CONDITIONS | | |
| | POWER INFORMATION SECTION | PARAMETERS RELATED TO Pw | |
| | | PARAMETERS RELATED TO Ps | |
| | | PARAMETERS RELATED TO Pc | |
| | | PARAMETERS RELATED TO Pb | |
| | | OTHER INFORMATION | |
| | RECORDING PULSE INFORMATION SECTION | Tmp | |
| | | dTtop OF EACH MARK LENGTH | |
| | | Ttop OF EACH MARK LENGTH | |
| | | Tlp OF EACH MARK LENGTH | |
| | | dTs OF EACH MARK LENGTH | |
| | | OTHER INFORMATION | |

1601: RECORDING PULSE TYPE
1603: REPRODUCING CONDITIONS
1604: (power information section start)
1605: RECORDING PULSE CONDITIONS
1602: RECORDING/REPRODUCING CONTROL INFORMATION

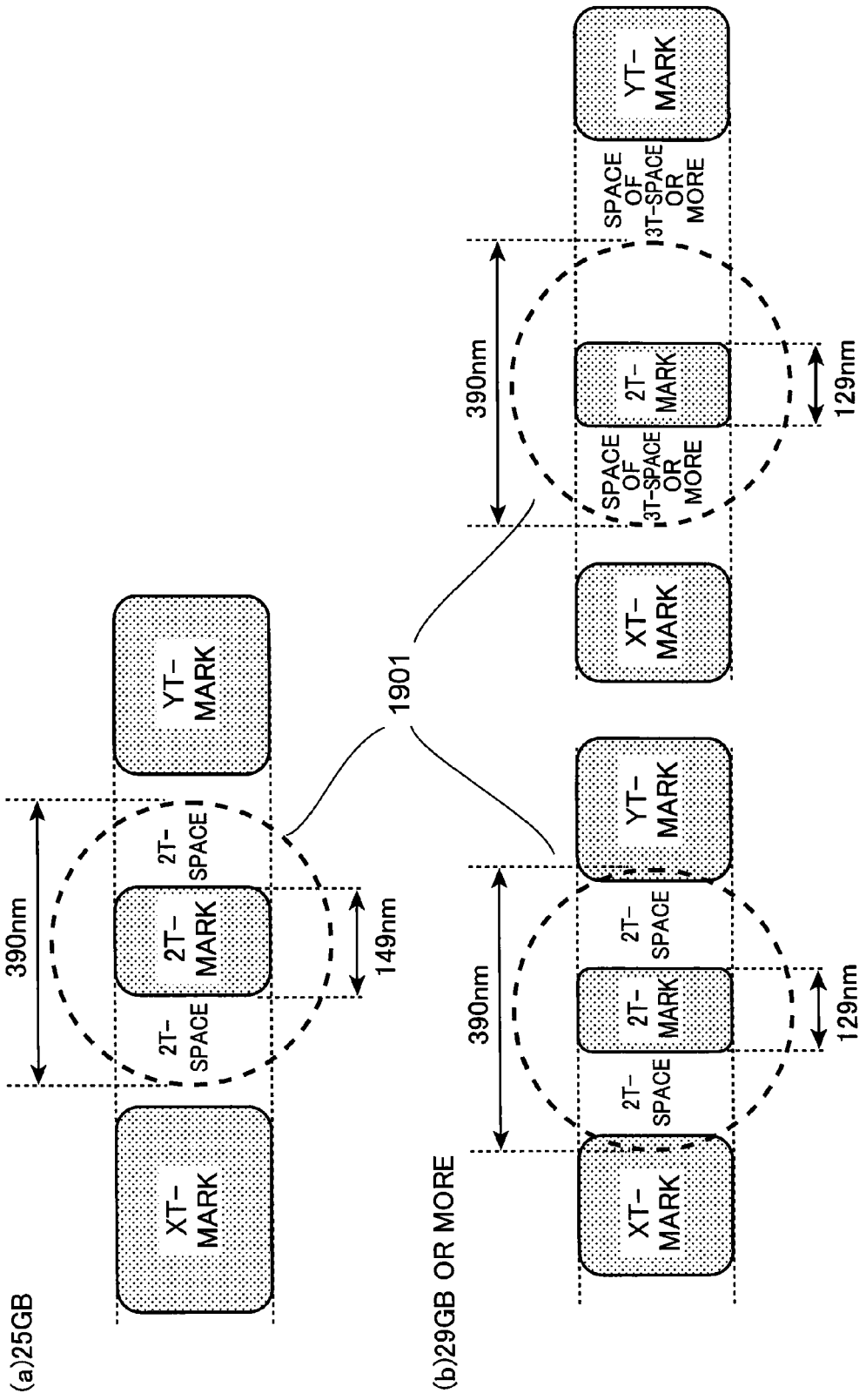

FIG.23

(a) dTtop/Top TABLE

| MARK<br>TRAILING SPACE \ PRECEDING SPACE | 2M | | 3M | 4,6,8M | 5,7,9M |
|---|---|---|---|---|---|
| | 2S | >=3S | | | |
| 2S | 1 | 5 | 9 | 13 | 17 |
| 3S | 2 | 6 | 10 | 14 | 18 |
| 4S | 3 | 7 | 11 | 15 | 19 |
| >=5S | 4 | 8 | 12 | 16 | 20 |

(b) dTs TABLE

| MARK<br>PRECEDING SPACE \ TRAILING SPACE | 2M | | 3M | 4,6,8M | 5,7,9M |
|---|---|---|---|---|---|
| | 2S | >=3S | | | |
| 2S | 1 | 5 | 9 | 13 | 17 |
| 3S | 2 | 6 | 10 | 14 | 18 |
| 4S | 3 | 7 | 11 | 15 | 19 |
| >=5S | 4 | 8 | 12 | 16 | 20 |

(c) dTlp/Tlp TABLE

| MARK<br>TRAILING SPACE | 4,6,8M | 5,7,9M |
|---|---|---|
| 2S | 1 | 5 |
| 3S | 2 | 6 |
| 4S | 3 | 7 |
| >=5S | 4 | 8 |

(d) Tmp TABLE

| Tmp |
|---|
| 1 |

US 8,509,044 B2

RECORDING MEDIUM AND RECORDING OR REPRODUCING APPARATUS THEREFOR FOR RECORDING OR REPRODUCING CONTROL INFORMATION

BACKGROUND OF INVENTION

This application is a 371 of PCT/JP2010/005654, filed Sep. 16, 2010.

TECHNICAL FIELD

The present invention relates to a recording medium for recording information by irradiating a laser beam, and more particularly, to an arrangement of control information which is recorded on an information recording medium in advance and which is used for performing recording/reproducing.

BACKGROUND ART

Generally, recording/reproducing control information used for performing recording or reproducing is recorded on an information recording medium such as an optical disc. For example, in a case of an optical disc described in Patent Literature 1, information which includes recording/reproducing control information and which is referred to as "disc information (hereinafter abbreviated as DI)" is recorded on an information recording medium. In addition, in the case of a DVD-RAM, a DVD-RW, a DVD+RW, a DVD-R, and a DVD+R, "physical format information (hereinafter abbreviated as PFI)" corresponds to the DI described above.

Furthermore, in addition to the above, there are cases where information in a same format as DI or PFI or a format conforming to DI or PFI is recorded in a predetermined area in an information recording medium by a recording/reproducing apparatus for the information recording medium or retained in an internal memory of the recording/reproducing apparatus.

Next, recording/reproducing control information will be described using an example of a DI structure of a conventional optical disc. FIG. 15 is a schematic diagram of a DI structure of a conventional optical disc in which at least one or more DI units are written in an area referred to as a lead-in area 1501 in Patent Literature 1. In addition, a DI unit has a size of 112 bytes. One DI unit contains a description of one recording pulse shape corresponding to one layer and one speed.

Next, a DI structure described in Patent Literature 1 is shown in FIG. 16. In FIG. 16, a DI unit comprises header information 1601 and recording/reproducing control information 1602. The recording/reproducing control information 1602 comprises a recording pulse type 1603 that specifies a recording pulse system adopted when performing recording, information related to reproducing conditions 1604, and recording pulse conditions 1605 that is an information section related to recording control parameters corresponding to the write system of 1603.

With an optical disc, recording pulse conditions for forming a recording mark is constituted by power information that indicates a power level of each pulse and recording pulse information that indicates a position or a pulse width of each pulse. Power information and recording pulse information may collectively be referred as a Write Strategy (hereinafter abbreviated as WS).

Next, power information and recording pulse information will be described with reference to FIG. 17. FIG. 17 represents an example of a recording pulse shape for forming a mark having a length that is equivalent to 8 times a channel clock T(=8T).

In the case of FIG. 17, power information includes information related to parameters in an amplitude direction of a recording pulse such as a peak power Pw 1701, a space power Ps 1702, a cooling power Pc 1703, and a bottom power Pb 1704. In addition, recording pulse information includes information related to parameters in a time axis direction of a recording pulse such as a top pulse width Ttop 1705, a top pulse width start position dTtop 1706, a multi-pulse width Tmp 1707, a final pulse width Tlp 1708, and a cooling pulse end position dTs 1709.

These parameters are stored in a DI unit in a format such as that shown in FIG. 18. Moreover, there may be cases where the recording/reproducing control information is recorded in a predetermined area in an information recording medium by a recording/reproducing apparatus for the information recording medium or retained in an internal memory of the recording/reproducing apparatus in a same format or a format conforming to the format shown in FIG. 18.

Furthermore, when recording is performed on all preceding or trailing space lengths using the same recording pulse information in addition to the recording/reproducing control information described above, a length of a recording mark ends up being changed due to a length of space that precedes or trails the recording mark. Therefore, respective units of recording pulse information may be defined based not only on a length of each mark but also on a relationship with a length of a space that precedes or trails the recording mark.

As a result of recent densification of information recording media, a minimum mark length of a recording mark is approaching a limit of resolution that is dependent on a detection system. For example, in a case where the information recording medium is an optical disc medium, a resolution that is dependent on a detection system refers to an optical resolution defined by a size of a light spot at which laser beams are collected. However, due to a limit of the resolution, an increase in intersymbol interference and a degradation of SNR (Signal Noise Ratio) become significant.

Hereinafter, a 12-cm optical disc medium using a blue laser having a wavelength of 405 nm will be described. According to Non Patent Literature 1, on an optical disc medium using a blue laser, a light spot at which laser beams are collected has a size of 390 nm. When each recording layer using an RLL (1,7) code as a recording code has a storage capacity of 25 GB, the optical disc medium has a minimum mark length of 149 nm.

In addition, for example, when the storage capacity per layer of the same optical disc medium is set to 29 GB or greater which corresponds to approximately 1.16 times the storage capacity per layer of a Blu-ray Disc, the minimum mark length becomes approximately 128 nm. Attempts in higher densification result in a further reduction in minimum mark length.

When using the same detection system as the optical disc medium using a blue laser described above, in a case where the storage capacity is 25 GB as shown in FIG. 19(a), a minimum mark/space (a 2T-mark or a 2T-space) has a size which allows 2.6 minimum marks/spaces to fit into a light spot 1901. However, when the storage capacity exceeds approximately 29 GB as shown in the left diagram in FIG. 19(b), the minimum mark/space assumes a size which allows 3 or more minimum marks/spaces to fit into the light spot 1901. Therefore, when 2T-spaces precede and trail a 2T-mark, a light beam exceeds the preceding and trailing spaces and overlap with a next mark. However, when preceding and trailing spaces have a length of 3T or more as shown in the right diagram in FIG. 19(b), this overlap does not occur. Therefore, when recording a 2T-mark, a state of thermal interference of a light beam differs between preceding and trailing spaces of 2T and preceding and trailing spaces with lengths other than 2T. Consequently, in order to reduce the influence of the thermal interference, recording pulse conditions that apply when recording a 2T-mark must be modified according to lengths of the spaces preceding and trailing the 2T-mark.

Hereinafter, a specific method of setting recording pulse information used when modifying recording conditions in correspondence with spaces preceding and trailing the 2T-mark will be described with reference to FIGS. 20 to 22. FIG. 20 shows recording conditions for preceding and trailing spaces of a 2T-mark in case of a recording pulse type referred to as a Castle recording pulse. FIG. 20(a) is a diagram showing parameters for defining Castle recording pulse conditions. Recording pulse power levels defined for a Castle recording pulse include Pw (2001) as a maximum power level, Pm (2002) as an intermediate power level, Ps (2003) as a space section power level, and Pc (2004) as a cooling power level for reducing thermal interference between marks. The following are defined as parameters for specifying durations of the respective power levels. Specifically, dTtop (2006, 2009, and 2013) defining a pulse start position adopted when recording a mark, Ttop (2005, 2008, and 2012) defining a start pulse width, dTc (2010 and 2015) defining an end position of a recording pulse of a 3T-mark or more, Tlp (2014) defining a maximum pulse width of a trailing end of a recording pulse of a 4T-mark or more, and dTs (2007, 2011, and 2016) defining a pulse width of a power level Pc for reducing thermal interference of a mark. Since dTtop (2006), Top (2005), and dTs (2007) are the parameters adopted when recording a 2T-mark, by setting these parameters to preceding and trailing spaces, a preceding/trailing space adaptation for a 2T-mark can be realized so as to enable high-density recording.

Tables of specific pulse width conditions are shown in tables (b) to (e) of FIGS. 20. Numerical values in each table denote serial numbers of parameters contained in the table. In the dTtop and Ttop table shown in FIG. 20(b), parameters for preceding spaces corresponding to 2T, 3T, 4T, and 5T or more are set for respective recording marks (2T to 5T or more). Trailing spaces are set divided into 2T and 3T or more only for recording conditions of a 2T-mark. The table is configured in this manner due to preceding spaces being finely set to 2T, 3T, 4T, and 5T or more because dTtop and Ttop are parameters that define a leading pulse and are therefore heavily dependent on a preceding space, while roughly dividing trailing spaces into 2T and 3T or more may suffice. In other words, dTtop and Ttop may be described as being set pulse values (parameters) defined based on a preceding space.

In the dTs table shown in table (c) of FIG. 20, parameters corresponding to trailing spaces of 2T, 3T, 4T, and 5T or more are set for respective recording marks (2T to 5T or more). Preceding spaces are set divided into 2T and 3T or more only for recording conditions of a 2T-mark. The table is configured in this manner due to trailing spaces being finely set to 2T, 3T, 4T, and 5T or more because dTs is a parameter that defines a trailing edge position of a recording mark and is therefore heavily dependent on a trailing space, while roughly dividing into 2T and 3T or more suffices for a preceding space. dTs is a set pulse value (parameter) defined based on a trailing space.

Since dTc and Tlp shown in tables (d) and (e) of FIGS. 20 are not included in pulse conditions of a 2T-mark, dTc and Tlp need not be set for preceding and trailing spaces and are only set for trailing spaces. Therefore, dTc and Tlp are set pulse values (parameters) defined based on a trailing space. As shown in FIG. 20, 80 independent parameters are required by the tables (b) to (e) which define recording pulse information that represents a shape of a Castle recording pulse on a side of a time axis.

FIG. 21(a) is a diagram showing parameters for defining a shape of a recording pulse referred to as an N−1 recording pulse. An N−1 recording pulse type is a recording system in which a mark with a length of N is recorded using N−1-number of consecutive pulses. Recording pulse power levels defined for N−1 recording pulse conditions include Pw (2101) as a maximum power level, Ps (2102) as a space section power level, Pc (2103) as a cooling power level for reducing thermal interference between marks, and Pb (2104) as an interpulse power level of a mark recorded by consecutive pulses. The following are defined as parameters for specifying durations of the respective power levels. Specifically, dTtop (2106, 2109, and 2113) defining a pulse start position adopted when recording a mark, Ttop (2105, 2108, and 2112) defining a start pulse width, Tlp (2110 and 2114) defining a pulse width of a trailing end of a recording pulse of a 3T-mark or more, dTlp (2116 and 2117) defining a pulse position of a trailing end of a recording pulse of a 3T-mark or more, dTs (2107, 2111, and 2115) defining a pulse width of a power level Pc for reducing thermal interference of a mark, and Tmp defining pulse intervals of a mark recorded by consecutive pulses. With an N−1 recording pulse, since dTtop (2106), Top (2105), and dTs (2107) are the parameters adopted when recording a 2T-mark in the same manner as with a Castle recording pulse type, by setting these parameters to preceding and trailing spaces, a preceding/trailing space adaptation for a 2T-mark can be realized so as to enable high-density recording.

Since the thinking behind specific parameter setting tables of the N−1 recording pulse type shown in tables (b) to (e) of FIGS. 21 is similar to that of the Castle recording pulse type, a detailed description will be omitted. As shown in FIG. 21, 85 independent parameters are required by the recording pulse information represented by the tables (b) to (e) which define a shape of an N−1 recording pulse on a side of a time axis. With an N−1 recording pulse, dTtop and Ttop are set values (parameters) defined based on a preceding space, and dTs, dTlp, and Tlp are set values (parameters) defined based on a trailing space.

FIG. 22 is a diagram showing parameters for defining a recording pulse type referred to as an N/2 recording pulse. An N/2 recording pulse is a recording system in which a recording mark with a length of N divided into even and odd numbers is recorded using consecutive pulses of N/2. Recording pulse power levels defined for an N/2 recording pulse include Pw (2201) as a maximum power level, Ps (2202) as a space section power level, Pc (2203) as a cooling power level for reducing thermal interference between marks, and Pb (2204) as an interpulse power level of a mark recorded by consecutive pulses. The following are defined as parameters for specifying durations of the respective power levels. Specifically, dTtop (2206, 2209, 2212, 2219, and 2225) defining a pulse start position adopted when recording a mark, Ttop (2205, 2208, 2211, 2218, and 2224) defining a start pulse width, Tlp (2215, 2221, and 2227) defining a maximum pulse width of a trailing end of a recording pulse of a 4T-mark or more, dTlp (2216, 2222, and 2228) defining a maximum pulse start position of a trailing end, dTs (2207, 2210, 2217, 2223, and 2229) defining a pulse width of a power level Pc for reducing thermal interference of a mark, and Tmp defining pulse intervals of a mark recorded by consecutive pulses. Since dTmp (2214, 2220, and 2226) defining a start position of Tmp is set to 0 when the mark length is an even number and to ½ mark length when the mark length is an odd number, dTmp is not defined as a modifiable parameter. With an N/2 recording pulse, since dTtop (2206), Top (2205), and dTs (2207) are the parameters adopted when recording a 2T-mark in the same manner as with a Castle recording pulse type, by setting these parameters to preceding and trailing spaces, a preceding/trailing space adaptation for a 2T-mark can be realized so as to enable high-density recording.

Since the thinking behind specific parameter setting tables of an N/2 recording pulse shown in tables (a) to (c) of FIGS. 23 is similar to that of the Castle recording pulse type, a detailed description will be omitted. As shown in FIG. 23, 77 independent parameters are required by the recording pulse information corresponding to the tables (a) to (c) which define a shape of an N/2 recording pulse on a side of a time axis. With an N/2 recording pulse, dTtop and Ttop are set values (parameters) defined based on a preceding space, and dTs, dTlp, and Tlp are set values (parameters) defined based on a trailing space.

As shown, since thermal interference increases as recording density is increased, a recording method in which parameters are conventionally independently set for preceding and trailing spaces without incident requires recording parameters dependent on preceding and trailing spaces when recording a 2T-mark, thereby creating a problem of complicating recording pulse setting conditions and increasing the number of parameters. When increasing recording density on a format compatible with conventional formats, this poses a serious problem since the number of bytes recordable in a DI unit is already prescribed by the format.

A DI unit used in 25 GB or 50 GB Blu-ray formats is limited to 112 bytes per one recording condition, and a recording pulse condition has an upper limit size of around 60 bytes. Therefore, it is extremely difficult to enhance recording condition parameters in order to perform high-density recording while maintaining format structure and compatibility. As a result, a problem occurs in that the recording condition described above requires 80 bytes with Castle, 85 bytes with N−1, and 76 bytes with N/2, and exceeds 60 bytes by a wide margin in any of these cases.

Citation List
Patent Literature
  Patent Literature 1: Japanese Patent Application Laid-open No. 2006-313621
Non Patent Literature
  Non Patent Literature 1: Illustrated Guide to Blu-ray Disc, Ohmsha, Ltd.

SUMMARY OF INVENTION

It is an object of the present invention to provide a recording medium and a recording/reproducing apparatus that enable significant reduction (compression) of a data volume of recording/reproducing control information.

A recording medium according to an aspect of the present invention records information by forming a space and a recording mark having a predetermined length that is an integral multiple of a channel clock T, wherein the recording medium has an information area in which set values of a recording pulse adopted when forming the recording mark having the predetermined length are recorded as recording/reproducing control information, preceding space-based set values that are defined based on a preceding space formed so as to precede the recording mark and trailing space-based set values that are defined based on a trailing space formed so as to trail the recording mark are included as the set values of the recording pulse adopted when forming the recording mark having the predetermined length, the preceding space-based set values include a first reference value that is a set value of a recording pulse corresponding to a predetermined preceding space and a first difference set value which is a set value of a recording pulse corresponding to a space other than the predetermined preceding space and which is expressed as a difference from the first reference value, and the trailing space-based set values include a second reference value that is a set value of a recording pulse corresponding to a predetermined trailing space and a second difference set value which is a set value of a recording pulse corresponding to a space other than the predetermined trailing space and which is expressed as a difference from the second reference value.

According to the configuration described above, since a part of preceding space-based set values (set values of recording pulses corresponding to spaces other than the predetermined preceding space) can be expressed by difference values which contain smaller volumes of data than the first reference value, a significant reduction (compression) of information volume can be achieved. In a similar manner, since trailing space-based set values have a data structure constituted by the second reference value (a set value of a recording pulse corresponding to a predetermined trailing space) and the second difference set value expressed as a difference from the second reference value (a set value of a recording pulse corresponding to a space other than the predetermined trailing space), a significant reduction (compression) of information volume can be achieved. As described above, the present configuration enables a data volume of recording/reproducing control information to be significantly reduced (compressed).

Favorably, a recording medium according to another aspect of the present invention records information by forming a space and a recording mark having a predetermined length that is an integral multiple of a channel clock T, wherein the recording medium has an information area in which set values of a recording pulse adopted when forming the recording mark having the predetermined length are recorded as recording/reproducing control information, preceding space-based set values that are defined based on a preceding space formed so as to precede the recording mark and trailing space-based set values that are defined based on a trailing space formed so as to trail the recording mark are included as the set values of the recording pulse adopted when forming the recording mark having the predetermined length, the preceding space-based set values include an arbitrary first predetermined value and a first difference set value that is expressed as a difference from the first predetermined value, and the trailing space-based set values include an arbitrary second predetermined value and a second difference set value that is expressed as a difference from the second predetermined value.

According to the configuration described above, since preceding space-based set values and trailing space-based set values can be expressed as difference values from an arbitrary predetermined value (the first predetermined value or the second predetermined value) and a data volume of the difference value can be reduced compared to the predetermined value, a data volume of recording/reproducing control information can be significantly reduced (compressed).

With the respective configurations of the present invention described above, in order to accommodate an increase in thermal interference due to densification of a recording medium caused by increasing a recording density of the recording medium while inheriting the same format as a conventional recording medium, an information volume of recording/reproducing control information can be compressed and recorded onto the recording medium even when an information volume of the recording/reproducing control information has increased as a result of an expansion of information related to a recording pulse. In this manner, by compressing information volume and recording recording/reproducing control information related to recording pulse conditions in a recording/reproducing control information area (a DI area or the like), a recording medium (an optical disc or the like) which is capable of realizing recording or reproducing and which has extremely high compatibility and a system (an optical disc system or the like) using the recording medium can be achieved without having to make any modifications whatsoever in a format of recording/reproducing control information that is recorded on the recording medium (the optical disc or the like).

A recording/reproducing apparatus according to another aspect of the present invention records or reproduces information to or from a recording medium which records information by forming a space and a recording mark having a predetermined length that is an integral multiple of a channel clock T, wherein the recording/reproducing apparatus comprises a memory unit having an information area in which set values of a recording pulse adopted when forming the recording mark having the predetermined length are recorded as recording/reproducing control information, preceding space-based set values that are defined based on a preceding space formed so as to precede the recording mark and trailing space-based set values that are defined based on a trailing space formed so as to trail the recording mark are included as the set values of the recording pulse adopted when forming the recording mark having the predetermined length, the preceding space-based set values include a first reference value that is a set value of a recording pulse corresponding to a predetermined preceding space and a first difference set value which is a set value of a recording pulse corresponding to a space other than the predetermined preceding space and which is expressed as a difference from the first reference value, and the trailing space-based set values include a second reference value that is a set value of a recording pulse corresponding to a predetermined trailing space and a second difference set value which is a set value of a recording pulse corresponding to a space other than the predetermined trailing space and which is expressed as a difference from the second reference value.

The technical ideas of the present invention are not only effective when recording recording/reproducing control information onto a recording medium but are similarly effective when arranging recording/reproducing control information in a memory on a recording/reproducing apparatus configured as described above.

The objects, features, and advantages of the present invention will become more apparent in the following detailed description and the accompanying drawings.

BRIEF DESCRIPTION OF DRAWINGS

FIG. 2 is a schematic view of DI information according to the first embodiment of the present invention.

FIG. 3 is an explanatory diagram showing details of a DI structure according to the first embodiment of the present invention.

FIG. 4 is an explanatory diagram showing a recording pulse table (Castle) according to the first embodiment of the present invention.

FIG. 5 is an explanatory diagram showing a recording pulse table (N-1) according to the first embodiment of the present invention.

FIG. 6 is an explanatory diagram showing a recording pulse table (N/2) according to the first embodiment of the present invention.

FIG. 7 is an explanatory diagram showing a recording pulse table of respective recording pulse types according to the first embodiment of the present invention.

FIG. 9 is an explanatory diagram showing a recording pulse table (Castle) according to a second embodiment of the present invention.

FIG. 10 is an explanatory diagram showing a recording pulse table (N-1) according to the second embodiment of the present invention.

FIG. 11 is an explanatory diagram showing a recording pulse table (N/2) according to the second embodiment of the present invention.

FIG. 12 is an explanatory diagram showing a recording pulse table of respective recording pulse types according to the second embodiment of the present invention.

FIG. 14 is an explanatory diagram showing a recording pulse table (Castle) according to a third embodiment of the present invention.

FIG. 15 is an explanatory diagram showing an example of a conventional DI structure.

FIG. 18 is an explanatory diagram showing a detailed example of conventional recording/reproducing conditions.

FIG. 19 is an explanatory diagram showing a mark size and a beam shape during high density recording.

FIG. 23 is an explanatory diagram showing a conventional recording pulse table (N/2).

DETAILED DESCRIPTION OF INVENTION

Hereinafter, embodiments of the present invention will be described with reference to the drawings. However, the following embodiments are merely examples of implementations of the present invention and are not intended to limit the technical scope of the present invention.

(First Embodiment)

Figure 1:
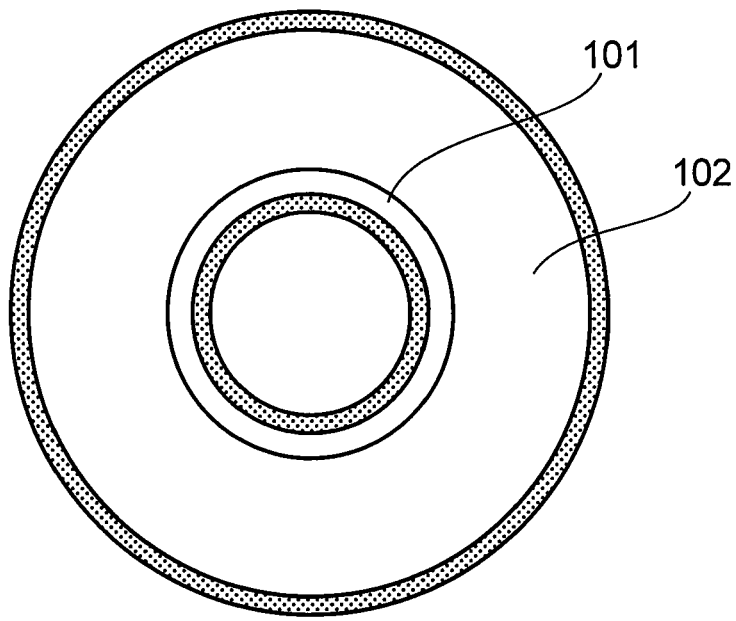
FIG. 1 is a plan view of an information recording medium according to a first embodiment of the present invention.

Hereinafter, an information recording medium and an apparatus for performing recording or reproducing to or from the information recording medium according to an embodiment of the present invention will be described with reference to the drawings. FIG. 1 is a plan view of an information recording medium according to an embodiment of the present invention. In FIG. 1, reference numeral 101 denotes a control information area and reference numeral 102 denotes an information recording area.

Details of DI that is recording/reproducing control information recorded in the control information area 101 will be described with reference to FIG. 2. FIG. 2 shows a configuration in which reference numerals 201 and 202 denote a plurality of units of recording/reproducing control information (DI), N-number (where N is a positive integer) of independent DI units are recorded in 201, and the same information is repetitively recorded in areas 202 and thereafter. This is a measure taken in order to enhance resistance to degrading factors of an optical disc which may occur in the market such as scratches and fingerprints by repetitively recording the same information a number of times. Data structures of respective DI units included in the area 201 will be described below.

In the area 201, record areas are secured for N-number of types of DI information units from 201-1 to 201-N. For each DI information unit, recording/reproducing control information corresponding to a disc layer number and a recording pulse type is recorded. Each DI information unit from 201-1 to 201-N is configured so as to include header information 203 and footer information 208 which are shared by all DI units. Each DI unit has a size of 112 bytes which is the same as in Patent Literature 1. The header information 203 includes information related to a structure of the area 201 (same as in Patent Literature 1). Information desirably commonly arranged in all DI units is arranged in a record area section of the footer information 208. Recording/reproducing control information 204 is constituted by a disc information section 205/209, reproducing conditions 206/210, and recording pulse conditions 207/211.

Each DI unit (201-1 to 201-N) is configured so as to include recording pulse conditions 207 or 211 as recording conditions respectively corresponding to a disc layer and a recording pulse type of the layer. Parameters can be uniquely set for each DI according to a recording pulse type corresponding to a disc layer number. The layer number and the recording pulse type are recorded in the disc information section such as 205/209 and recording conditions suited for a corresponding layer can be selected based on this information. In addition, the number of valid DI units recorded in the area 201 is described in the header section (the recording area of the header information 203), and the number of valid DI units in 201 can be acquired by referring to this value. In the present embodiment, zero data is recorded for the disc information section, the reproducing conditions, and the recording pulse conditions of an invalid DI unit. Moreover, in addition to the information described above, speed information indicating at what speed recording is to be performed, DI number information indicating a total number of DI units, and information indicating a sequential order of a DI unit currently being reproduced among all DI units may be recorded in the header section.

FIG. 3 shows details of each DI unit (from 201-1 to 201-N). The disc information section 205 consists of 18 bytes and includes: reference numeral 301 denoting a media type of a layer specified by the DI (a rewritable layer, a write-once layer, or a read-only layer); reference numeral 302 denoting information on a disc size and a disc format version; disc structure information 303 indicating the number of layers and a media type of the disc; reference numeral 304 denoting hybrid disc structure information which indicates a hybrid configuration with a disc of another format by high-order bits and information on recording density (channel bit length) by low-order bits; reference numeral 305 denoting information on a polarity of tracking of each layer; reference numeral 306 denoting information on a polarity of a recording mark of each layer; BCA presence/absence flag information 307 indicating a presence or absence of a BCA (burst cutting area); data area management information 308 indicating information on a final address of a data area; and an 1-byte reserved 309.

In addition, the reproducing conditions 206 comprise: recording/reproducing speed information 310 that is a line speed during recording or reproducing; information 311 on a maximum reproducing power permissible in a state where high frequency superposition is not added to a laser; information 312 on a maximum reproducing power permissible in a state where high frequency superposition is added to a laser; and an 1-byte reserved 313. Furthermore, the recording pulse conditions 211 are constituted by recording power information 314 that is information for specifying a power level during recording, and recording pulse information 315 that is information for specifying a pulse duration during recording. Since parameters of the recording pulse conditions 211 differ according to the shape of a recording pulse, the contents of the recording pulse conditions 211 vary in correspondence with recording pulse type information recorded in the header information 203. As described earlier, recording pulse types include Castle, N−1, and N/2. When assigning values so that a shape of a 2T recording pulse differs for preceding and trailing spaces in order to realize high density recording according to the present application, recording pulse information that is information necessary for specifying a pulse duration requires 80 bytes for Castle, 85 bytes for N−1, and 76 bytes for N/2 as already described in the previous section.

However, recording all the necessary information shown in FIG. 3 into the 112 byte-size of a DI unit results in an upper limit of 60 bytes as the number of bytes assignable as recording pulse information. In order to solve this problem, a recording medium according to the present application enables recording power information to be described in 60 bytes or less for all recording pulse types by exercising ingenuity in a data structure of the recording pulse information 315 described earlier. The data structure of the recording pulse information 315 which is a feature of the present application will now be specifically described for each recording pulse type.

Figure 20:
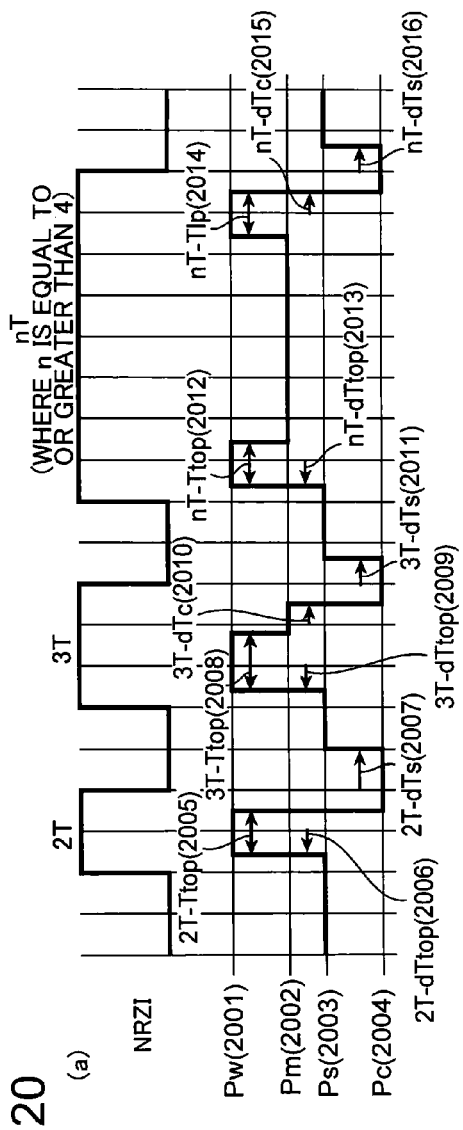
FIG. 20 is an explanatory diagram showing a conventional recording pulse (Castle).

First, a Castle recording pulse will be described. Conventionally, as already described with reference to FIG. 20, since a Castel recording pulse is constituted by 80 parameters, an information volume of 80 bytes is required. On the other hand, in the first embodiment of the present invention, the number of bytes of data has been reduced using the data structure shown in FIG. 4. The numerical values in the tables shown in FIG. 4 indicate the numbers of bytes necessary for defining information in the tables. Among parameters of dTtop and Ttop (preceding space-based set values), a parameter of respective marks having a preceding space of 5 spaces or more is given an information volume of 1 byte and is taken as a first reference value. For the first reference value, values of dTtop and Ttop are assumed as-is.

On the other hand, for preceding spaces ranging from 4 spaces to 2 spaces, a first difference set value is recorded as a difference from the values of dTtop and Ttop (first reference value) of a preceding space of 5 spaces or more. While pulse conditions of dTtop and Ttop are highly dependent on a length of a mark to be recorded, dependency on a preceding space is reduced. Therefore, by computing a difference in values from the first reference value for a preceding space of 5 spaces or more for each recording mark with a preceding space ranging from 4 spaces to 2 spaces, values in the table that are required from 4 spaces to 2 spaces can be reduced. The difference in values (the first difference set value) can be kept within a range of +7 to −8 which is expressible by 0.5 bytes. In a similar manner, for dTs, dTc, and Tlp (trailing space-based set values), a parameter of respective marks having a trailing space of 5 spaces or more is given 1 byte of information and is taken as a second reference value, and by describing a difference from the second reference value as a second difference set value in the tables, values in the tables can also be compressed into a range expressible by 0.5 bytes for a trailing space ranging from 4 spaces to 2 spaces.

In this manner, the information volume of tables can be compressed by using a recording parameter of a case where a preceding space is 5 spaces or more as a reference and defining a difference from the reference in a table for recording pulse parameters that are dependent on a preceding space (preceding space-based set values) and by using a recording parameter of a case where a trailing space is 5 spaces or more as a reference and defining a difference from the reference in a table for recording pulse parameters that are dependent on a trailing space (trailing space-based set values). Although Castle recording pulse information conventionally requires 80 bytes, the information volume can be compressed down to 50 bytes by introducing the table structure shown in FIG. 4 and, as a result, recording pulse conditions can be written on a disc while maintaining a conventional format structure. Consequently, compatibility with conventional optical discs can be increased and an optical disc and an optical disc system with high format compatibility can be realized. In the present embodiment, values defined by 1 byte or by 0.5 bytes as a difference in the table shown in FIG. 4 correspond to values in units of 1/32 channel clock. However, in a case where resolution can only be expressed in units of 1/16 channel clock, a resolution of 1/16 can be set by adopting even set values. This method is effective for providing common set values in cases where two types of resolutions, namely, 1/16 and 1/32, are provided.

Figure 21:
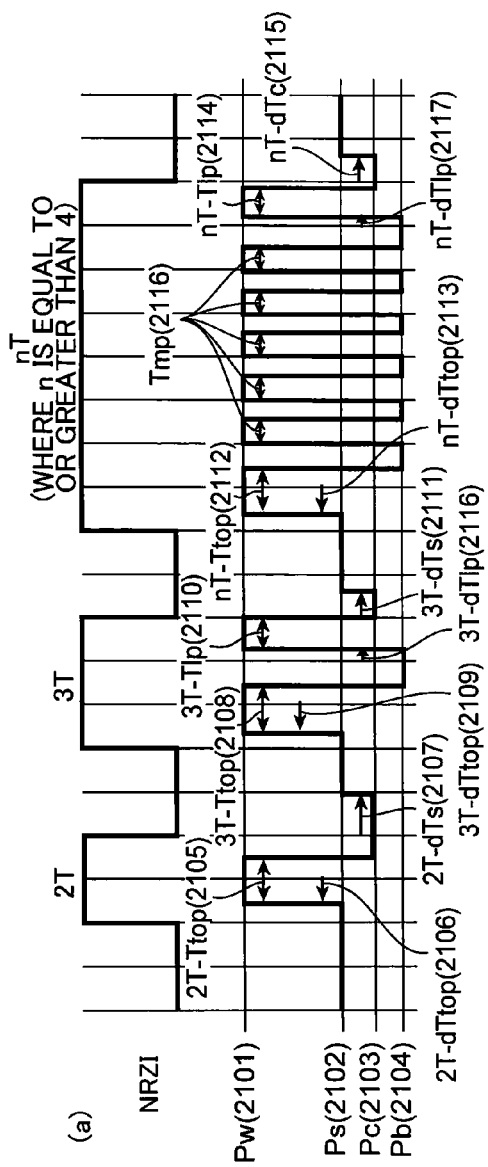
FIG. 21 is an explanatory diagram showing a conventional recording pulse (N-1).

Next, an N−1 recording pulse type will be described. Since an N−1 recording pulse is constituted by 85 parameters as already described with reference to FIG. 21, an information volume of 85 bytes is conventionally required for recording pulse information. However, by compressing data based on the same thinking as that of the Castle type described above, a table structure shown in FIG. 5 is obtained. Therefore, the number of bytes necessary for a table can be reduced down to 53.5 bytes. Among the set values of an N−1 recording pulse, preceding space-based set values that are defined based on a preceding space formed so as to precede a recording mark are dTtop and Ttop, and trailing space-based set values that are defined based on a trailing space formed so as to trail a recording mark are dTs, dTlp, and Tlp.

Figure 22:
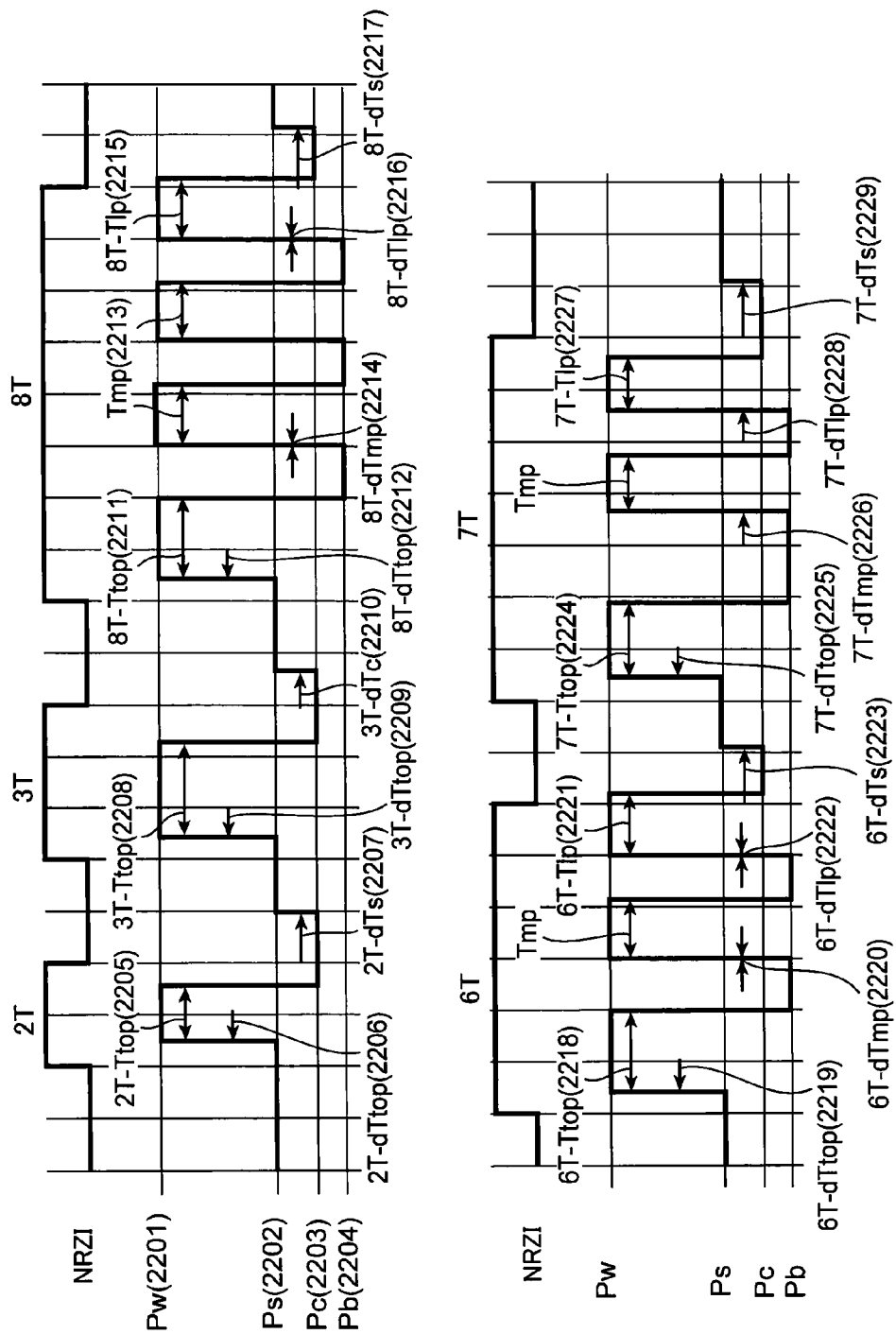
FIG. 22 is an explanatory diagram showing a conventional recording pulse (N/2).

Next, an N/2 recording pulse type will be described. Since an N/2 recording pulse is constituted by 76 parameters as already described with reference to FIGS. 22 and 23, an information volume of 76 bytes is conventionally required for recording pulse information. However, by compressing data based on the same thinking as that of the Castle type described above, a table structure shown in FIG. 6 is obtained. Therefore, the number of bytes necessary for a table can be reduced down to 48.5 bytes. Among the set values of an N/2 recording pulse, preceding space-based set values that are defined based on a preceding space formed so as to precede a recording mark are dTtop and Ttop, and trailing space-based set values that are defined based on a trailing space formed so as to trail a recording mark are dTs, dTlp, and Tlp.

FIG. 7 shows specific table structures of the recording pulse information 315 defined according to recording pulse type. As shown in FIG. 7, the recording pulse information 315 has a structure broadly divided into: a table 701 (the first information area) that retains parameters which are defined by a byte size and which have a preceding space or a trailing space of 5T-space or more (the first reference value or the second reference value); and a table 702 (the second information area) that retains information on differences from the parameters in the table 701 (the first difference set value or the second difference set value) for a preceding space or a trailing space other than 5T-space or more (in other words, a preceding space or a trailing space less than 5T-space). In other words, an information area in which recording/reproducing control information is recorded has a data structure including: the table 701 (the first information area) in which the first reference value and the second reference value are consecutively recorded; and the table 702 (the second information area) which is arranged separated from and subsequent to the table 701 and in which the first difference set value and the second difference set value are consecutively recorded.

By adopting the structure described above, since difference information that is defined by 0.5 bytes is arranged in an concentrated manner in the table 702, a parameter of a single table can be prevented from being arranged so as to straddle a byte boundary. In other words, when arranging a mixture of information expressed by 1 byte and information expressed by 0.5 bytes, arranging an odd number of 0.5-byte information units causes 1-byte information units to be arranged so as to straddle byte boundaries and creates a data structure that is complicated to process. Therefore, an attempt to avoid such an occurrence creates a waste equivalent to 0.5 bytes at a boundary portion of 0.5 bytes and increases the size of the table. The table structure shown in FIG. 7 has been conceived in order to address this problem and enables maximization of data arrangement efficiency.

Figure 8:
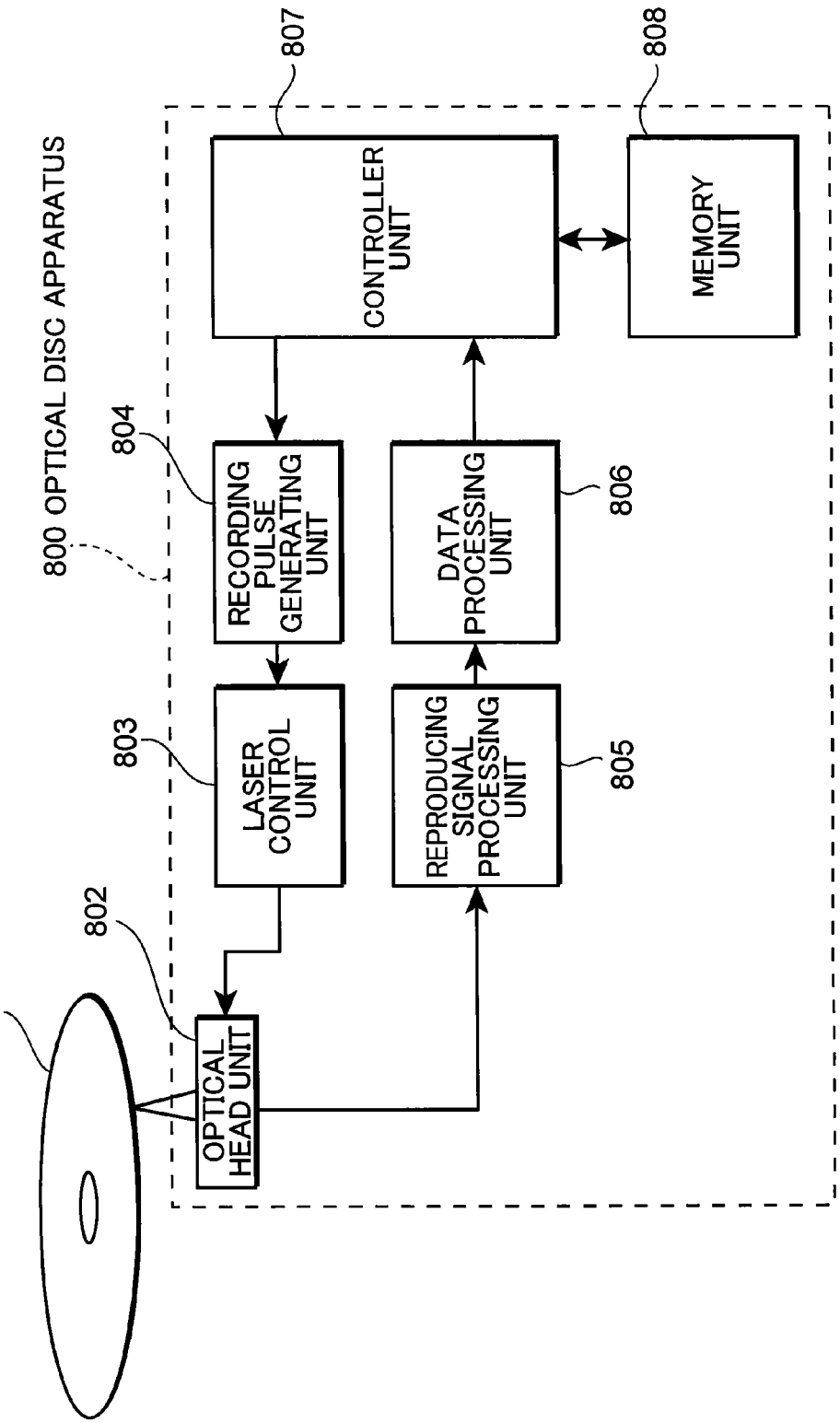
FIG. 8 is a block diagram showing a schematic configuration of an optical disc apparatus according to the first embodiment of the present invention.

FIG. 8 is a diagram showing an optical disc apparatus 800 according to the first embodiment of the present invention. The optical disc apparatus 800 is an apparatus for reproducing information from an information recording medium (recording medium) 801 mounted to the apparatus or for recording information on the information recording medium 801. The information recording medium 801 is, for example, an optical disc. The optical disc apparatus 800 comprises an optical head unit 802, a laser control unit 803, a recording pulse generating unit 804, a reproducing signal processing unit 805, a data processing unit 806, a controller unit 807, and a memory unit 808. First, reproduction by the optical disc apparatus 800 will be described. The optical head unit 802 causes laser beams having passed through an objective lens to converge on a recording layer of the information recording medium 801, and receives a reflected beam of the laser beam to generate an analog reproducing signal indicating information recorded on the information recording medium 801. An analog reproducing signal reproduced from the information recording medium 801 is processed by the reproducing signal processing unit 805 and becomes a binary signal which is then handed over to the data processing unit 806.

The data processing unit 806 generates reproducing data from the received binary signal and transmits the reproducing data to the controller unit 807. Next, recording of information on the information recording medium 801 by the optical disc apparatus 800 will be described. The controller unit 807 transmits recording data and recording/reproducing control information to the recording pulse generating unit 804. The recording/reproducing control information is written on the information recording medium 801. The recording pulse generating unit 804 generates a recording signal based on the received recording data and recording conditions. The laser control unit 803 having received the generated recording signal records data by controlling emission of a laser mounted on the optical head unit based on the recording signal to form a mark on the information recording medium 801.

With such an optical disc apparatus 800, in some cases, recording is performed by reading recording/reproducing control information recorded on the information recording medium 801, while in other cases, recording is performed based on recording/reproducing control information stored in advance in the memory unit 808. In this case, reducing the data volume of recording/reproducing control information also contributes to reducing a memory size of an optical disc drive on which recording is performed. With an ordinary optical disc apparatus, recording pulse information necessary for recording on an optical disc must be stored for each medium in a semiconductor memory. Therefore, a problem occurs in that an increase in the number of media types constricts memory size. By compressing recording pulse conditions using the data structures shown in FIGS. 4 to 6 which exemplify the first embodiment of the present invention, an added advantage of reducing a memory size of the semiconductor memory can be gained.

(Second Embodiment)

Hereinafter, an information recording medium according to a second embodiment of the present invention will be described with reference to the drawings. FIGS. 9 to 11 are diagrams respectively specifying the number of bytes in Castle recording pulse information, N−1 recording pulse information, and N/2 recording pulse information according to the second embodiment. In the first embodiment, parameters for dTtop and Ttop for preceding spaces ranging from 4T to 2T are all specified by 0.5 bytes. However, in the present second embodiment, among parameters for preceding spaces ranging from 4T to 2T, only for those with a preceding space of 2T and a recording mark of 2T, a parameter size of 1 byte is specified for dTtop. In a similar manner, for dTs, among parameters for trailing spaces ranging from 4T to 2T, only for parameters with a trailing space of 2T and a recording mark of 2T, a parameter size of 1 byte is specified for dTtop. Otherwise, recording pulse information according to the present second embodiment has a same data structure as in the first embodiment. In addition, a structure of a table according to the second embodiment is shown in FIG. 12. This represents a measure necessary for recording at an even higher density than in the first embodiment. A detailed description of this measure will now be given with reference to FIG. 13.

Figure 13:
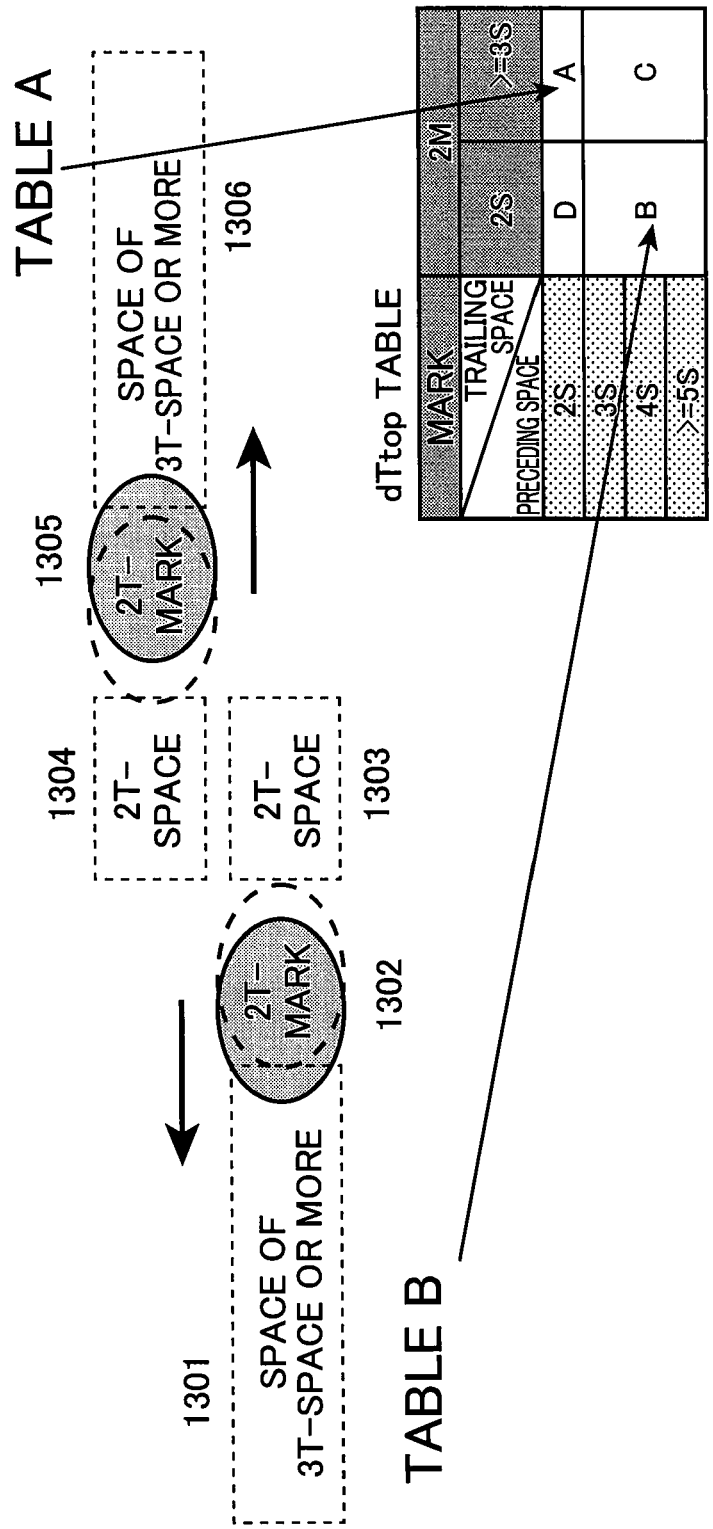
FIG. 13 is an explanatory diagram illustrating a shift of a 2T-mark in a 2T consecutively-recorded section.
Figure 16:
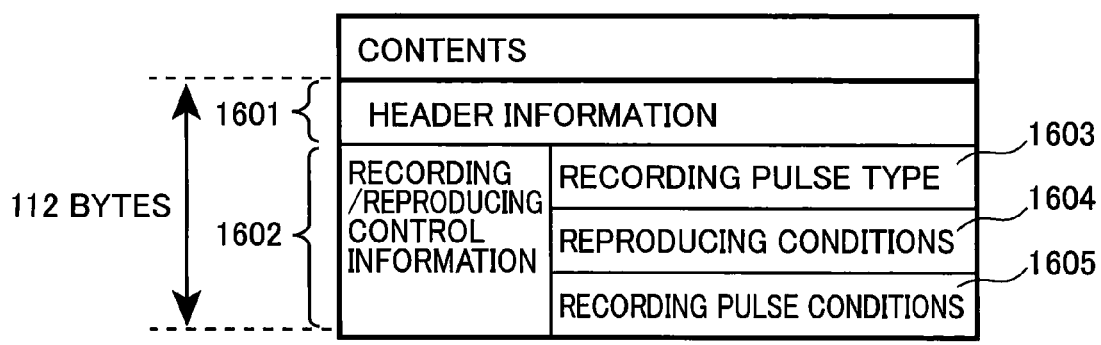
FIG. 16 is an explanatory diagram showing a detailed example of a conventional DI structure.
Figure 17:
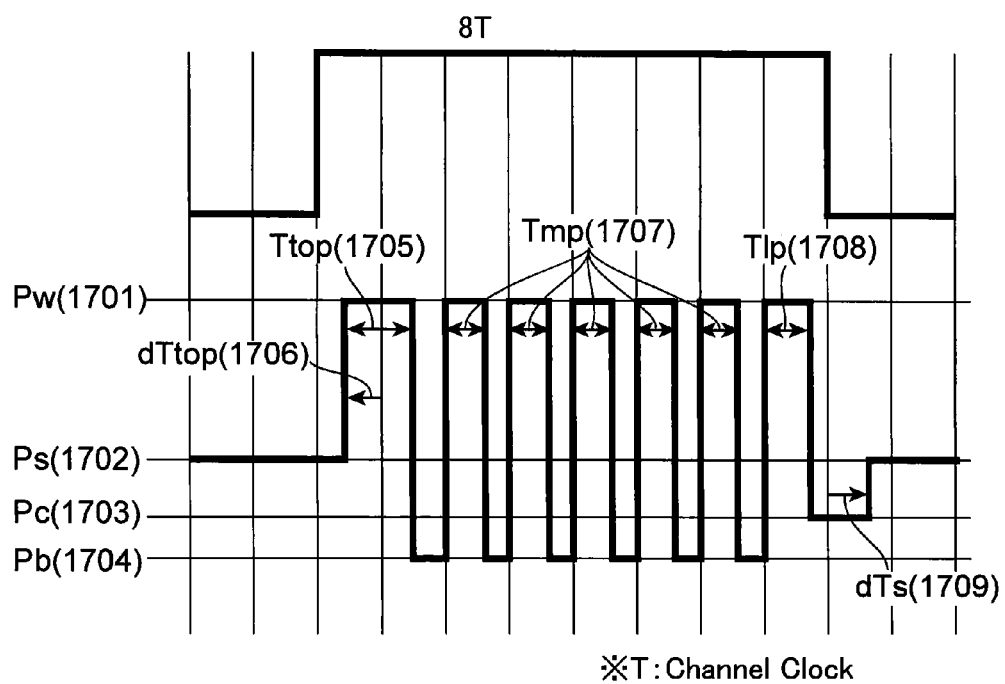
FIG. 17 is an explanatory diagram showing a recording pulse type (N-1) used in a conventional optical disc.

FIG. 13 is a diagram schematically showing mark displacements due to thermal interference when consecutively recording a 2T-mark and a 2T-space. Generation of thermal interference is greatest in a case where a 2T-mark and a 2T-space are recorded. In this case, there are two possible patterns as shown in FIG. 13. A first pattern (table B) is a case of recording a space of 3T-space or more 1301, followed by a 2T-mark 1302, and finally a 2T-space 1303. This case corresponds to a section B in a dTtop table shown in FIG. 13.

A second pattern (table A) is a case of recording a 2T-space 1304, followed by a 2T-mark 1305, and finally a space of 3T-space or more 1306. This case corresponds to a section A in the dTtop table shown in FIG. 13. In these patterns, the 2T recording marks are affected by thermal interference and shift from their original recording positions (the mark positions depicted by dotted lines in the diagram) in directions denoted by arrows in FIG. 13. In order to avoid this thermal shift of marks, dTtop that is a recording start pulse position and dTs corresponding to a recording end pulse position of a 2T-mark must be shifted. For this reason, in a system with increased thermal interference due to increased recording density, values of tables corresponding to A and B of dTtop and dTs must be shifted by a certain amount in a positive/negative direction in relation to each other in order to compensate for the thermal interference. As a result, significant differences are created between D and B and between A and C in the tables. An expansion of a correction amount such as those shown in FIGS. 9 to 11 must be made in order to express these differences in the tables. In the examples shown in FIGS. 9 to 11, since a parameter size of 1 byte is specified for dTtop only in a case where a preceding space is 2T and a recording mark is 2T, and for dTs, a parameter size of 1 byte is specified for dTtop only in a case where a trailing space is 2T and a recording mark is 2T, such shifting can be readily accommodated. Due to the second embodiment, recording conditions capable of correcting mark displacements of 2T consecutive patterns which had conventionally been difficult to correct can now be provided.

(Third Embodiment)

Hereinafter, an information recording medium according to a third embodiment of the present invention will be described with reference to the drawings. In the first embodiment, a difference from a case of a preceding space or a trailing space of 5T-space or more is specified as a parameter. In this case, when a parameter used as a reference for calculating a difference (in the first embodiment, for example, a preceding space or a trailing space of 5T or more) is a maximum parameter or a minimum parameter, an offset amount increases and an information volume of 4 bits (0.5 bytes) may not be sufficient for definition.

The third embodiment has been made in order to solve the problem described above. While a difference from a case of a preceding space or a trailing space of 5T-space or more is specified as a parameter in the first embodiment, the third embodiment adopts a system in which an arbitrary value is described in a table and a difference from this value is described in the table as a parameter. Predetermined values in FIG. 14 that is an explanatory diagram of the third embodiment corresponds to this value. In other words, in the third embodiment, a preceding space-based reference value (with a Castle recording pulse, dTtop and Ttop) includes an arbitrary first predetermined value and a first difference set value that is expressed as a difference value from the first predetermined value. In addition, a trailing space-based reference value (with a Castle recording pulse, dTs, dTc, and Tlp) includes an arbitrary second predetermined value and a second difference set value that is expressed as a difference value from the second predetermined value. The third invention is an invention related to a table configuration in which the predetermined values (the first predetermined value and the second predetermined value) are specified by 1 byte and a difference from the predetermined values (the first difference set value and the second difference set value) are set by 0.5 bytes for each mark. Since the configuration enables a value closest to center to be defined as an initial set value, a maximum recording pulse condition can be specified even by difference information of 0.5 bytes. Although FIG. 14 shows a case of a Castle recording pulse, since basic thinking for N−1 and N/2 recording pulses are the same, a detailed description thereof will be omitted.

As described above, the present invention provides means to reduce information volumes in a case where recording pulse information is expanded and an information value of recording/reproducing control information increases due to future densification of information recording media or a case where a total information value of recording/reproducing control information increases due to an increase in the number of layers of an information recording medium. This technology is a very important technology in developing the format for accomplishing high-density recording.

As described above, a recording medium according to an aspect of the present invention records information by forming a space and a recording mark having a predetermined length that is an integral multiple of a channel clock T, wherein the recording medium has an information area in which set values of a recording pulse adopted when forming the recording mark having the predetermined length are recorded as recording/reproducing control information, preceding space-based set values that are defined based on a preceding space formed so as to precede the recording mark and trailing space-based set values that are defined based on a trailing space formed so as to trail the recording mark are included as the set values of the recording pulse adopted when forming the recording mark having the predetermined length, the preceding space-based set values include a first reference value that is a set value of a recording pulse corresponding to a predetermined preceding space and a first difference set value which is a set value of a recording pulse corresponding to a space other than the predetermined preceding space and which is expressed as a difference from the first reference value, and the trailing space-based set values include a second reference value that is a set value of a recording pulse corresponding to a predetermined trailing space and a second difference set value which is a set value of a recording pulse corresponding to a space other than the predetermined trailing space and which is expressed as a difference from the second reference value.

According to the configuration described above, recording/reproducing control information is recorded on a recording medium, and the recording/reproducing control information includes set values of a recording pulse adopted when forming a recording mark of a predetermined length. In addition, set values of a recording pulse include a preceding space-based set value that is defined based on a preceding space formed so as to precede the recording mark and a trailing space-based set value that is defined based on a trailing space formed so as to trail the recording mark. Furthermore, trailing space-based set values have a data structure constituted by a first reference value (a set value of a recording pulse corresponding to a predetermined preceding space) and a first difference set value expressed as a difference from the first reference value (a set value of a recording pulse corresponding to a space other than the predetermined trailing space).

As described above, since a part of preceding space-based set value (set values of recording pulses corresponding to spaces other than the predetermined preceding space) can be expressed by difference values which contain smaller volumes of data than the first reference value, a significant reduction (compression) of information volume can be achieved. In a similar manner, since trailing space-based set values have a data structure constituted by the second reference value (a set value of a recording pulse corresponding to a predetermined trailing space) and the second difference set value expressed as a difference from the second reference value (a set value of a recording pulse corresponding to a space other than the predetermined trailing space), a significant reduction (compression) of information volume can be achieved. As described above, the present configuration enables a data volume of recording/reproducing control information to be significantly reduced (compressed).

Accordingly, in order to accommodate an increase in thermal interference due to densification of a recording medium caused by increasing a recording density of the recording medium while inheriting the same format as a conventional recording medium, an information volume of recording/reproducing control information can be compressed and recorded onto the recording medium even when an information volume of the recording/reproducing control information has increased as a result of an expansion of information related to a recording pulse. In this manner, by compressing information volume and recording recording/reproducing control information related to recording pulse conditions in a recording/reproducing control information area (a DI area or the like), a recording medium (an optical disc or the like) which is capable of realizing recording or reproducing and which has extremely high compatibility and a system (an optical disc system or the like) using the recording medium can be achieved without having to make any modifications whatsoever in a format of recording/reproducing control information that is recorded on the recording medium (the optical disc or the like).

Favorably, for the first reference value that is a set value of a recording pulse corresponding to the predetermined preceding space, the predetermined preceding space is a space of 5T or more, and for the second reference value that is a set value of a recording pulse corresponding to the predetermined trailing space, the predetermined trailing space is a space of 5T or more.

In this manner, by using a set value of a recording pulse corresponding to a preceding space or a trailing space of 5T or more as a reference value (the first reference value or the second reference value) and taking a difference value from the reference value as a set value of a recording pulse corresponding to a preceding space or a trailing space less than 5T, the difference value can be relatively reduced and the data volume can be further reduced.

Furthermore, in the configuration described above, favorably, the information area in which the recording/reproducing control information is recorded includes: a first information area in which the first reference value and the second reference value are consecutively recorded; and a second information area which is arranged separated from and subsequent to the first information area and in which the first difference set value and the second difference set value are consecutively recorded.

According to the configuration described above, the information area in which the recording/reproducing control information is recorded has a data structure arranged divided into the first information area and the second information area. In this case, the first reference value and the second reference value are consecutively recorded in the first information area, and the first difference set value and the second difference set value are to be consecutively recorded after the first information area. In other words, this is a data structure in which reference values (the first reference value and the second reference value) are arranged in an concentrated manner in the first information area and difference set values (the first difference set value and the second difference set value) that are difference values with a smaller data volume than the reference values are arranged in an concentrated manner in the second information area. Accordingly, an arrangement of a mixture of reference values and difference set values with different data volumes can be prevented and an advantage of enhancing data arrangement efficiency may be achieved.

In the configuration described above, favorably, the first reference value and the second reference value each have a size of 1 byte and the first difference set value and the second difference set value each have a size of 0.5 bytes.

In this manner, the size of reference values (the first reference value and the second reference value) can be set to 1 byte and the size of difference set values (the first difference set value and the second difference set value) which are difference values with smaller data volumes than the reference values can be set to 0.5 bytes. In addition, by adopting a data structure in which reference values (the first reference value and the second reference value) are arranged in an concentrated manner in the first information area and difference set values (the first difference set value and the second difference set value) are arranged in an concentrated manner in the second information area separate from the first information area, each parameter (a reference value or a difference set value) can be prevented from being arranged so as to straddle a byte boundary and data arrangement efficiency can be maximized. In other words, when arranging a mixture of information expressed by 1 byte and information expressed by 0.5 bytes, arranging an odd number of 0.5-byte information units causes 1-byte information units to be arranged so as to straddle byte boundaries and creates a data structure that is complicated to process. Therefore, an attempt to avoid such an occurrence creates a waste equivalent to 0.5 bytes at a boundary portion of 0.5 bytes and increases the size of the recording/reproducing control information. In contrast, by adopting a data structure arranged divided into the first information area and the second information area, recording/reproducing control information can be recorded on a recording medium in a minimum size and data arrangement efficiency can be maximized.

Furthermore, favorably, the first reference value and the second reference value each have a size of 1 byte, the first difference set value with a preceding space corresponding to 2T has a size of 1 byte and the first difference set value with a preceding space corresponding to a length other than 2T has a size of 0.5 bytes, and the second difference set value with a trailing space corresponding to 2T has a size of 1 byte and the second difference set value with a trailing space corresponding to a length other than 2T has a size of 0.5 bytes.

In order to avoid shifting of a 2T recording mark from its original recording position due to the influence of thermal interference, information on recording conditions for correcting the shift is further required. However, as is the case of the configuration described above, by changing the parameter size of difference set values (the first difference set value and the second difference set value) corresponding to a preceding space and a trailing space of 2T from 0.5 bytes to 1 byte, information on recording conditions for correcting the shift can be recorded. Accordingly, recording conditions that enable correction of a position displacement of a 2T recording mark can be provided.

Favorably, a recording medium according to another aspect of the present invention records information by forming a space and a recording mark having a predetermined length that is an integral multiple of a channel clock T, wherein the recording medium has an information area in which set values of a recording pulse adopted when forming the recording mark having the predetermined length are recorded as recording/reproducing control information, preceding space-based set values that are defined based on a preceding space formed so as to precede the recording mark and trailing space-based set values that are defined based on a trailing space formed so as to trail the recording mark are included as the set values of the recording pulse adopted when forming the recording mark having the predetermined length, the preceding space-based set values include an arbitrary first predetermined value and a first difference set value that is expressed as a difference from the first predetermined value, and the trailing space-based set values include an arbitrary second predetermined value and a second difference set value that is expressed as a difference from the second predetermined value.

According to the configuration described above, since preceding space-based set values and trailing space-based set values can be expressed as difference values from an arbitrary predetermined value (the first predetermined value or the second predetermined value) and a data volume of the difference value can be reduced compared to the predetermined value, a data volume of recording/reproducing control information can be significantly reduced (compressed).

Accordingly, in order to accommodate an increase in thermal interference due to densification of a recording medium caused by increasing a recording density of the recording medium while inheriting the same format as a conventional recording medium, an information volume of recording/reproducing control information can be compressed and recorded onto the recording medium even when an information volume of the recording/reproducing control information has increased as a result of an expansion of information related to a recording pulse. In this manner, by compressing information volume and recording recording/reproducing control information related to recording pulse conditions in a recording/reproducing control information area (a DI area or the like), a recording medium (an optical disc or the like) which is capable of realizing recording or reproducing and which has extremely high compatibility and a system (an optical disc system or the like) using the recording medium can be achieved without having to make any modifications whatsoever in a format of recording/reproducing control information that is recorded on the recording medium (the optical disc or the like).

In addition, favorably, the information area in which the recording/reproducing control information is recorded includes: a first information area in which the first predetermined value and the second predetermined value are consecutively recorded; and a second information area which is arranged separated from and subsequent to the first information area and in which the first difference set value and the second difference set value are consecutively recorded.

In the configuration described above, favorably, the first predetermined value and the second predetermined value each have a size of 1 byte and the first difference set value and the second difference set value each have a size of 0.5 bytes.

A recording/reproducing apparatus according to an aspect of the present invention records or reproduces information to or from a recording medium which records information by forming a space and a recording mark having a predetermined length that is an integral multiple of a channel clock T, wherein the recording/reproducing apparatus comprises a memory unit having an information area in which set values of a recording pulse adopted when forming the recording mark having the predetermined length are recorded as recording/reproducing control information, preceding space-based set values that are defined based on a preceding space formed so as to precede the recording mark and trailing space-based set values that are defined based on a trailing space formed so as to trail the recording mark are included as the set values of the recording pulse adopted when forming the recording mark having the predetermined length, the preceding space-based set values include a first reference value that is a set value of a recording pulse corresponding to a predetermined preceding space and a first difference set value which is a set value of a recording pulse corresponding to a space other than the predetermined preceding space and which is expressed as a difference from the first reference value, and the trailing space-based set values include a second reference value that is a set value of a recording pulse corresponding to a predetermined trailing space and a second difference set value which is a set value of a recording pulse corresponding to a space other than the predetermined trailing space and which is expressed as a difference from the second reference value.

The technical ideas of the present invention are not only effective when recording recording/reproducing control information onto a recording medium but are similarly effective when arranging recording/reproducing control information in a memory on a recording/reproducing apparatus configured as described above.

In the configuration described above, favorably, the information area in which the recording/reproducing control information is recorded includes: a first information area in which the first reference value and the second reference value are consecutively recorded; and a second information area which is arranged separated from and subsequent to the first information area and in which the first difference set value and the second difference set value are consecutively recorded.

Furthermore, favorably, the first reference value and the second reference value each have a size of 1 byte and the first difference set value and the second difference set value each have a size of 0.5 bytes.

According to the present invention, since recording/reproducing control information can be appropriately recorded even if recording/reproducing control information increases due to densification of recording density or an increased number of layers in a recording medium, contributions can be made to realizing a general-purpose high-density information recording medium.

EXPLANATION OF REFERENCE NUMERALS 101 control information area
102 information recording area
201 DI
202 DI
203 header information
204 recording/reproducing control information
205 disc information section
206 reproducing conditions
207 recording pulse information section
208 footer information
301 media type of layer
302 disc size/version information
303 disc structure information
304 hybrid disc structure information/channel bit length
305 polarity of tracking signal of each layer
306 polarity of recording mark of each layer
307 BCA (burst cutting area) presence/absence flag
308 data area management information
309 reserved
310 recording/reproducing speed
311 maximum reproducing power without high frequency superposition
312 maximum reproducing power during high frequency superposition
313 reserved
314 recording power information
315 recording pulse information
701 table of 5T-space or more (first information area)
702 table of other than 5T-space or more (second information area)
800 optical disc apparatus
801 information recording medium
802 optical head unit
803 laser control unit
804 recording pulse generating unit
805 reproducing signal processing unit
806 data processing unit
807 controller unit
808 memory unit

The invention claimed is:

1. A recording medium which records information by forming a space and a recording mark having a predetermined length as an integral multiple of a channel clock T, the recording medium having an information area in which set values of a recording pulse used when forming the recording mark having the predetermined length are recorded as recording or reproducing control information, wherein
the set values of the recording pulse used when forming the recording mark having the predetermined length include preceding space-based set values that are defined based on a preceding space formed so as to precede the recording mark and trailing space-based set values that are defined based on a trailing space formed so as to trail the recording mark,
the preceding space-based set values are defined by a reference table including a first reference value that is a set value of a recording pulse corresponding to a preceding space of 5T or more and a first difference set value which is a set value of a recording pulse corresponding to a preceding space of 2T, 3T, and 4T other than the preceding space of 5T or more and which is expressed as a difference from the first reference value, and
the trailing space-based set values are defined by a reference table including a second reference value that is a set value of a recording pulse corresponding to a trailing space of 5T or more and a second difference set value which is a set value of a recording pulse corresponding to a trailing space of 2T, 3T, and 4T other than the trailing space of 5T or more and which is expressed as a difference from the second reference value.

2. The recording medium according to claim 1, wherein the information area in which the recording or reproducing control information is recorded includes:
a first information area in which the first reference value and the second reference value are consecutively recorded; and
a second information area which is arranged separated from and subsequent to the first information area and in which the first difference set value and the second difference set value are consecutively recorded.

3. The recording medium according to claim 1, wherein the first reference value and the second reference value each have a size of 1 byte, and
the first difference set value and the second difference set value each have a size of 0.5 bytes.

4. The recording medium according to claim 1, wherein the first reference value and the second reference value each have a size of 1 byte,
the first difference set value with a preceding space corresponding to 2T has a size of 1 byte and the first difference set value with a preceding space corresponding to a length other than 2T has a size of 0.5 bytes, and
the second difference set value with a trailing space corresponding to 2T has a size of 1 byte and the second difference set value with a trailing space corresponding to a length other than 2T has a size of 0.5 bytes.

5. A recording or reproducing apparatus comprising,
a memory unit having an information area in which set values of a recording pulse used when forming a recording mark having a predetermined length are recorded as recording or reproducing control information when information is recorded to or reproduced from a recording medium that records information by forming spaces and the recording mark having the predetermined length as an integral multiple of a channel clock T, wherein the set values of the recording pulse used when forming the recording mark having the predetermined length include preceding space-based set values that are defined based on a preceding space formed so as to precede the recording mark and trailing space-based set values that are defined based on a trailing space formed so as to trail the recording mark, the preceding space-based set values are defined by a reference table including a first reference value that is a set value of a recording pulse corresponding to a preceding space of 5T or more and a first difference set value which is a set value of a recording pulse corresponding to a preceding space of 2T, 3T, and 4T other than the preceding space of 5T or more and which is expressed as a difference from the first reference value, and the trailing space-based set values are defined by a reference table including a second reference value that is a set value of a recording pulse corresponding to a trailing space of 5T or more and a second difference set value which is a set value of a recording pulse corresponding to a trailing space of 2T, 3T, and 4T other than the trailing space of 5T or more and which is expressed as a difference from the second reference value.

6. The recording or reproducing apparatus according to claim 5, wherein the information area in which the recording or reproducing control information is recorded includes:

a first information area in which the first reference value and the second reference value are consecutively recorded; and a second information area which is arranged separated from and subsequent to the first information area and in which the first difference set value and the second difference set value are consecutively recorded.

7. The recording or reproducing apparatus according to claim 5, wherein the first reference value and the second reference value each have a size of 1 byte, and the first difference set value and the second difference set value each have a size of 0.5 bytes.

* * * * *